US012730251B2

(12) United States Patent
Chen et al.

(10) Patent No.: US 12,730,251 B2
(45) Date of Patent: Sep. 8, 2026

(54) IMAGE SENSING MODULE, CAMERA MODULE AND ELECTRONIC DEVICE

(71) Applicant: LARGAN INDUSTRIAL OPTICS CO., LTD., Taichung City (TW)

(72) Inventors: Chih Cheng Chen, Taichung City (TW); Tsao-Pin Chen, Taichung City (TW); Tzu Kan Chen, Taichung City (TW); Shen-Wu Hsiao, Taichung City (TW); Lin An Chang, Taichung City (TW); Wen-Yu Tsai, Taichung City (TW); Chien-Pang Chang, Taichung City (TW)

(73) Assignee: LARGAN INDUSTRIAL OPTICS CO., LTD., Taichung City (TW)

( * ) Notice: Subject to any disclaimer, the term of this patent is extended or adjusted under 35 U.S.C. 154(b) by 7 days.

(21) Appl. No.: 19/008,758

(22) Filed: Jan. 3, 2025

(65) Prior Publication Data

US 2026/0079284 A1 Mar. 19, 2026

(30) Foreign Application Priority Data

Sep. 19, 2024 (TW) ................................ 113135517

(51) Int. Cl.
*H04N 23/54* (2023.01)
*G02B 1/118* (2015.01)
*H04N 23/55* (2023.01)

(52) U.S. Cl.
CPC ............. *G02B 1/118* (2013.01); *H04N 23/54* (2023.01); *H04N 23/55* (2023.01); *G02B 2207/101* (2013.01)

(58) Field of Classification Search
None
See application file for complete search history.

(56) References Cited

U.S. PATENT DOCUMENTS 11,075,242 B2 * 7/2021 Kuo ...................... H10F 77/413
11,581,351 B2 2/2023 Hubert et al.
(Continued)

FOREIGN PATENT DOCUMENTS

CN 111863843 A 10/2020
CN 212783428 U 3/2021
(Continued)

OTHER PUBLICATIONS

UK Search and Examination Report dated Mar. 16, 2026 as received in Application No. 2513612.8.

*Primary Examiner* — Cynthia Calderon
(74) *Attorney, Agent, or Firm* — Maschoff Brennan

(57) ABSTRACT

An image sensing module includes a circuit substrate, an optical flat element, a sensing element, metal protrusions and an anti-reflection layer. The circuit substrate has an upper surface, a lower surface opposite to the upper surface, an opening surface connected to the upper and lower surfaces, and an opening located at the opening surface. The optical flat element is fixed on the upper surface. The sensing element is disposed on the lower surface. The opening is located between the sensing element and the optical flat element. The sensing element and the optical flat element form an air gap therebetween. The opening surface surrounds the air gap. The metal protrusions are disposed between and electrically connected to the circuit substrate and the sensing element. The anti-reflection layer is disposed on a surface at the air gap and includes nano-ridge structures extending towards the air gap and irregularly arranged.

18 Claims, 35 Drawing Sheets

(56) References Cited

U.S. PATENT DOCUMENTS

| | | | | |
|---|---|---|---|---|
| 12,224,299 | B2 * | 2/2025 | Lee | H10F 39/804 |
| 12,526,501 | B2 | 1/2026 | Chen et al. | |
| 2004/0095501 | A1 | 5/2004 | Aizawa et al. | |
| 2010/0328525 | A1 | 12/2010 | Lee et al. | |
| 2016/0112614 | A1 * | 4/2016 | Masuda | H10F 39/8063 348/374 |
| 2016/0255258 | A1 * | 9/2016 | Kon | H04N 23/56 348/370 |
| 2017/0264800 | A1 * | 9/2017 | Wang | H04N 13/239 |
| 2018/0027157 | A1 * | 1/2018 | Masuda | H10F 77/50 348/374 |
| 2019/0319053 | A1 * | 10/2019 | Suzuki | H04N 25/70 |
| 2021/0020671 | A1 * | 1/2021 | Cheng | H10F 39/199 |
| 2021/0136264 | A1 * | 5/2021 | Kim | H04N 23/55 |
| 2022/0139980 | A1 * | 5/2022 | Lin | H10F 39/8053 348/207.99 |
| 2022/0310399 | A1 * | 9/2022 | Nakane | H10P 52/00 |
| 2022/0400193 | A1 | 12/2022 | Tsai et al. | |
| 2022/0407993 | A1 * | 12/2022 | Tsai | H04N 23/55 |
| 2023/0058946 | A1 * | 2/2023 | Fan | G02B 1/113 |
| 2024/0014234 | A1 * | 1/2024 | Chen | H10F 39/8063 |
| 2024/0128233 | A1 | 4/2024 | Chang et al. | |
| 2024/0204026 | A1 | 6/2024 | Kang et al. | |
| 2024/0234457 | A1 | 7/2024 | Hsu et al. | |
| 2025/0185393 | A1 * | 6/2025 | Schimert | H10F 39/804 |
| 2025/0264638 | A1 * | 8/2025 | Chi | G02B 13/18 |
| 2025/0314807 | A1 * | 10/2025 | Hong | G02B 1/118 |

FOREIGN PATENT DOCUMENTS

| | | | |
|---|---|---|---|
| CN | 217879938 | U | 11/2022 |
| CN | 116134621 | A | 5/2023 |
| EP | 4 303 933 | A1 | 1/2024 |

* cited by examiner 1-4

IMAGE SENSING MODULE, CAMERA MODULE AND ELECTRONIC DEVICE

RELATED APPLICATIONS

This application claims priority to Taiwan Application 113135517, filed on Sep. 19, 2024, which is incorporated by reference herein in its entirety.

BACKGROUND

Technical Field

The present disclosure relates to an image sensing module, a camera module and an electronic device, more particularly to an image sensing module applicable to a camera module and an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, some elements in conventional optical systems are difficult to meet the requirement of high optical quality of an electronic device under diversified development in recent years, particularly as non-imaging light tends to be reflected within conventional imaging lenses to affect image quality. Therefore, how to improve structures of internal components in an imaging lens to reduce the reflection intensity of non-imaging light in order to meet the requirement of high-end-specification electronic devices is an important topic in this field nowadays.

SUMMARY

According to one aspect of the present disclosure, an image sensing module includes a circuit substrate, an optical flat element, a sensing element, and a plurality of metal protrusions. The circuit substrate has an upper surface, a lower surface, an opening surface, and an opening. The upper surface and the lower surface are disposed opposite to each other. The opening surface is connected to the upper surface and the lower surface. The opening is located at the opening surface. The optical flat element is fixed on the upper surface of the circuit substrate. The optical flat element is disposed corresponding to the opening of the circuit substrate. The sensing element is disposed on the lower surface of the circuit substrate. The opening of the circuit substrate is located between the sensing element and the optical flat element. The sensing element and the optical flat element form an air gap therebetween. The opening surface surrounds the air gap. The plurality of metal protrusions are disposed between the circuit substrate and the sensing element. Each of the plurality of metal protrusions is electrically connected to the circuit substrate and the sensing element. The image sensing module further includes at least one anti-reflection layer disposed on at least one surface at the air gap. The at least one anti-reflection layer includes a plurality of nano-ridge structures extending along a direction from the at least one surface at the air gap towards the air gap. The plurality of nano-ridge structures are irregularly arranged.

According to another aspect of the present disclosure, a camera module includes a lens module and the aforementioned image sensing module, wherein the image sensing module is disposed on an image side of the lens module.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
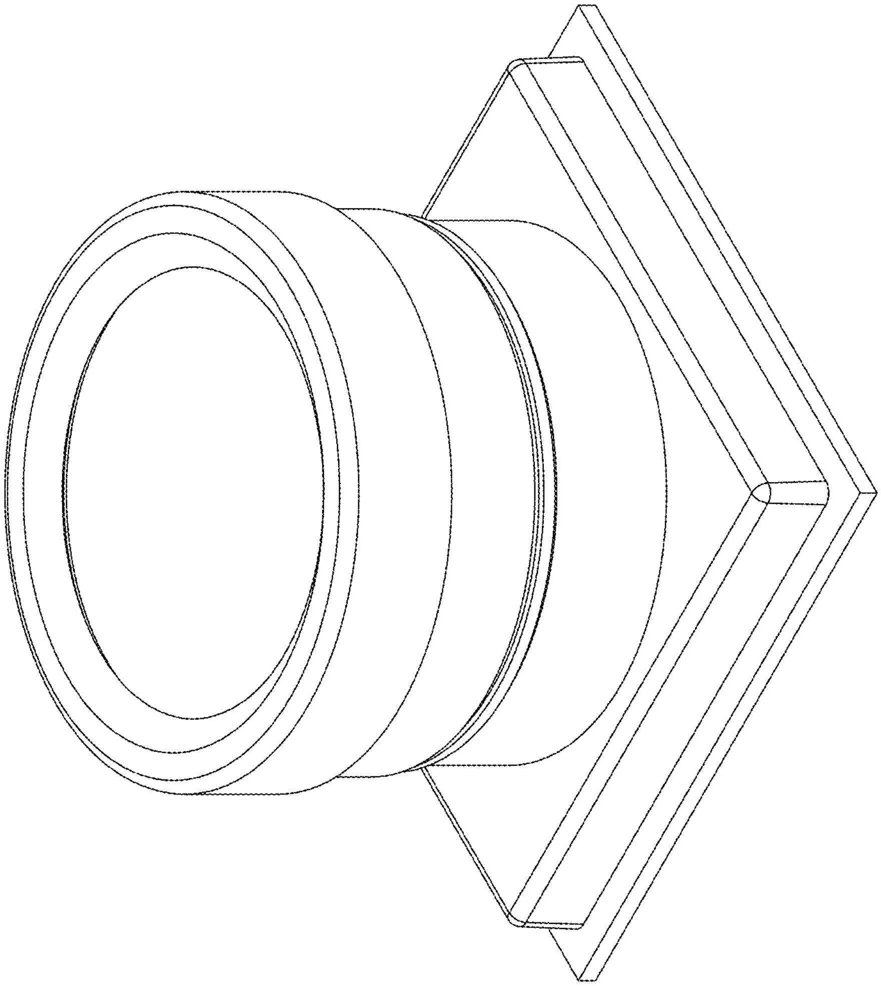
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the present disclosure, a camera module is provided. The camera module includes a lens module and an image sensing module. The lens module is configured for light passing therethrough. The image sensing module is disposed on an image side of the lens module.

The image sensing module can include a circuit substrate, an optical flat element, a sensing element, a plurality of metal protrusions, a filling element and at least one anti-reflection layer.

The circuit substrate may be made of, for example, ceramic, aluminum, PTFE (polytetrafluoroethylene), etc., but the present disclosure is not limited thereto. The circuit substrate can have an upper surface, a lower surface, an opening surface and an opening. The upper surface and the lower surface are disposed opposite to each other. The opening surface is connected to the upper surface and the lower surface. The opening is located at the opening surface.

The optical flat element may be, for example, a filter, a blue glass or a cover glass, but the present disclosure is not limited thereto. The optical flat element is fixed on the upper surface of the circuit substrate. Moreover, the optical flat element may be fixedly adhered to the circuit substrate through, for example, adhesive, but the present disclosure is not limited thereto. The optical flat element is disposed corresponding to the opening of the circuit substrate. The optical flat element can have an inner surface and an outer surface disposed opposite to each other.

The sensing element is disposed on the lower surface of the circuit substrate, with the opening of the circuit substrate located between the sensing element and the optical flat element. The sensing element and the optical flat element form an air gap therebetween, with the opening surface disposed surrounding the air gap. Moreover, the inner surface of the optical flat element can be disposed facing towards the air gap. Moreover, the boundary of the air gap can be defined by three surfaces as the surface of the sensing element facing towards the optical flat element, the surface of the optical flat element facing towards the sensing element, and the opening surface, but the present disclosure is not limited thereto.

The sensing element can have a sensing surface and a periphery surface disposed surrounding the sensing surface. The sensing surface can be disposed corresponding to the opening of the circuit substrate, and the sensing surface is configured to convert an optical image signal of light passing through the lens module into an electrical signal. Moreover, the sensing surface can be provided with a micro lens array disposed thereon.

The metal protrusions may be, for example, cylindrical, spherical, conical or in hourglass shapes, but the present disclosure is not limited thereto. The metal protrusions are disposed between the circuit substrate and the sensing element, with each metal protrusion electrically connected to the circuit substrate and the sensing element. Moreover, the metal protrusions can be disposed on the periphery surface of the sensing element and arranged on at least one side of the periphery surface. Therefore, it is favorable for ensuring electrical connectivity and the miniaturization of the image sensing module and for increasing design flexibility of the metal protrusions. Moreover, the metal protrusions can be alternatively disposed on the periphery surface of the sensing element and arranged on at least two opposite sides of the periphery surface, but the present disclosure is not limited thereto. Moreover, the metal protrusions can be alternatively disposed surrounding the air gap, but the present disclosure is not limited thereto.

The filling element can be disposed between the circuit substrate and the sensing element, the filling element can wholly cover each metal protrusion, and the filling element can surround and seal the air gap. Therefore, it is favorable for preventing impurities on the sensing element during the manufacturing process of the image sensing module, and it is also favorable for improving durability of the metal protrusions. The filling element can have at least one curved surface. The at least one curved surface may be, for example, convex or concave, but the present disclosure is not limited thereto. Moreover, the filling element can have at least part disposed on the opening surface of the circuit substrate. Therefore, it is favorable for securing tightness of the sealing of the filling element. Moreover, the filling element may be made of an opaque material. Therefore, it is favorable for improving optical image quality. Moreover, the filling element may be, for example, a black colloid, or may be, for example, made of an insulation material, but the present disclosure is not limited thereto.

The at least one anti-reflection layer is disposed on at least one surface at the air gap. According to the definition of the boundary of the air gap discussed above, the at least one surface at the air gap may be a surface related to the said three surfaces as the surface of the sensing element facing towards the optical flat element, the surface of the optical flat element facing towards the sensing element, and the opening surface. It can also be considered that the at least one surface may be one of the said three surfaces, a surface extending to two of the said three surfaces, or a surface extending to the said three surfaces, but the present disclosure is not limited thereto. Moreover, the at least one anti-reflection layer can be disposed on at least one of the upper surface, the lower surface and the opening surface of the circuit substrate. Therefore, it is favorable for reducing the possibility of generation of stray light. Moreover, the at least one anti-reflection layer can also be disposed on the inner surface of the optical flat element. Therefore, it is favorable for reducing surface reflection occurring at the internal of the optical flat element. Moreover, the at least one anti-reflection layer can also be disposed on the outer surface of the optical flat element. Moreover, the at least one anti-reflection can also be disposed on at least one of the sensing surface and the periphery surface of the sensing element. Therefore, it is favorable for simplifying manufacturing process. Moreover, the at least one anti-reflection layer can also be disposed on the micro lens array over the sensing surface. Moreover, the at least one anti-reflection layer can also be disposed on the filling element. Moreover, the at least one anti-reflection layer can also be disposed on the at least one curved surface of the filling element. Therefore, it is favorable for ensuring the anti-reflection ability of the filling element, and it is also favorable for increasing design flexibility of the at least one anti-reflection layer.

The at least one anti-reflection layer includes a plurality of nano-ridge structures. The nano-ridge structures may be made of, for example, aluminium oxide, etc., but the present disclosure is not limited thereto. Moreover, the nano-ridge structures can be doped with titanium, vanadium, chromium, tantalum, zirconium, niobium, or oxides of the aforementioned metals, but the present disclosure is not limited thereto. The nano-ridge structures extend along a direction from the at least one surface at the air gap towards the air gap, and the nano-ridge structures are irregularly arranged.

In the image sensing module or the camera module discussed above, by electrically connecting the metal protrusions to the circuit substrate and the sensing element, along with the design of the at least one anti-reflection layer, electrical connectivity of an image sensing module in a flip-chip packaged type provided by the present disclosure can be ensured. This arrangement also meets the requirement for miniaturization of the image sensing module while reducing the loss of optical image signals, thereby improving the signal-to-noise ratio of images to provide good optical image quality.

When a height of each of the plurality of nano-ridge structures is H, the following condition can be satisfied: 25 nm (nanometers)$\leq$H$\leq$400 nm. Therefore, it is favorable for increasing manufacturing efficiency of the image sensing module. Moreover, the following condition can also be satisfied: 40 nm$\leq$H$\leq$280 nm. Therefore, it is favorable for achieving good anti-reflection effect. Moreover, H as the structure height of the plurality of nano-ridge structures may be a perpendicular height from the bottom to the top of the plurality of nano-ridge structures when the plurality of nano-ridge structures are observed in a cross-sectional view thereof (destructive measurement), but the present disclosure is not limited thereto. Moreover, the heights of any three of the plurality of nano-ridge structures chosen for the height measurement can be located within the range of the above-mentioned condition of H, but the present disclosure is not limited thereto.

When a distance between the lower surface of the circuit substrate and the optical flat element is D1, and a thickness of the air gap is D2, the following condition can be satisfied: $0.25\leq D1/D2\leq 0.98$. Therefore, it is favorable for further meeting the requirements of miniaturization. Moreover, the following condition can also be satisfied: $0.3\leq D1/D2\leq 0.95$. Therefore, it is favorable for further improving the yield rate of the image sensing module. Moreover, the thickness of the air gap can be reduced by etching the circuit substrate, but the present disclosure is not limited thereto.

The circuit substrate can further have a plurality of anti-flare structures. The anti-flare structures can be disposed on the opening surface of the circuit substrate, and the anti-flare structures can taper off towards the air gap from the opening surface. With the design of the anti-flare structures, it is favorable for further reducing the interference of stray light and providing good ability in image recognition. Moreover, each anti-flare structure may have, for example, a sharp end or a rounded end, but the present disclosure is not limited thereto.

The at least one anti-reflection layer can further include an interlayer. The interlayer can be disposed between the at least one surface at the air gap and the nano-ridge structures. With the design of the interlayer, it is favorable for increasing the yield rate of coating. Moreover, the interlayer may be, for example, a single layer film or a multi-layer film, which can be used in optical anti-reflection or anti-impurity, or can be used as a material matching layer. However, the present disclosure is not limited thereto. Moreover, the thickness of the interlayer can be greater than the height of the nano-ridge structures, but the present disclosure is not limited thereto. Moreover, the interlayer can have at least one area exposed to the air gap. Therefore, it is favorable for increasing the mass-production possibility of the at least one anti-reflection layer.

The camera module can further include a protection layer. The protection layer may be, for example, made of colloid, resin, polymer, etc., but the present disclosure is not limited thereto. The protection layer can be disposed on a side of the image sensing module away from the lens module. Therefore, it is favorable for protecting the circuit substrate, the optical flat element, the sensing element, the metal protrusions, the filling element and the at least one anti-reflection layer from being affected by external environment.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
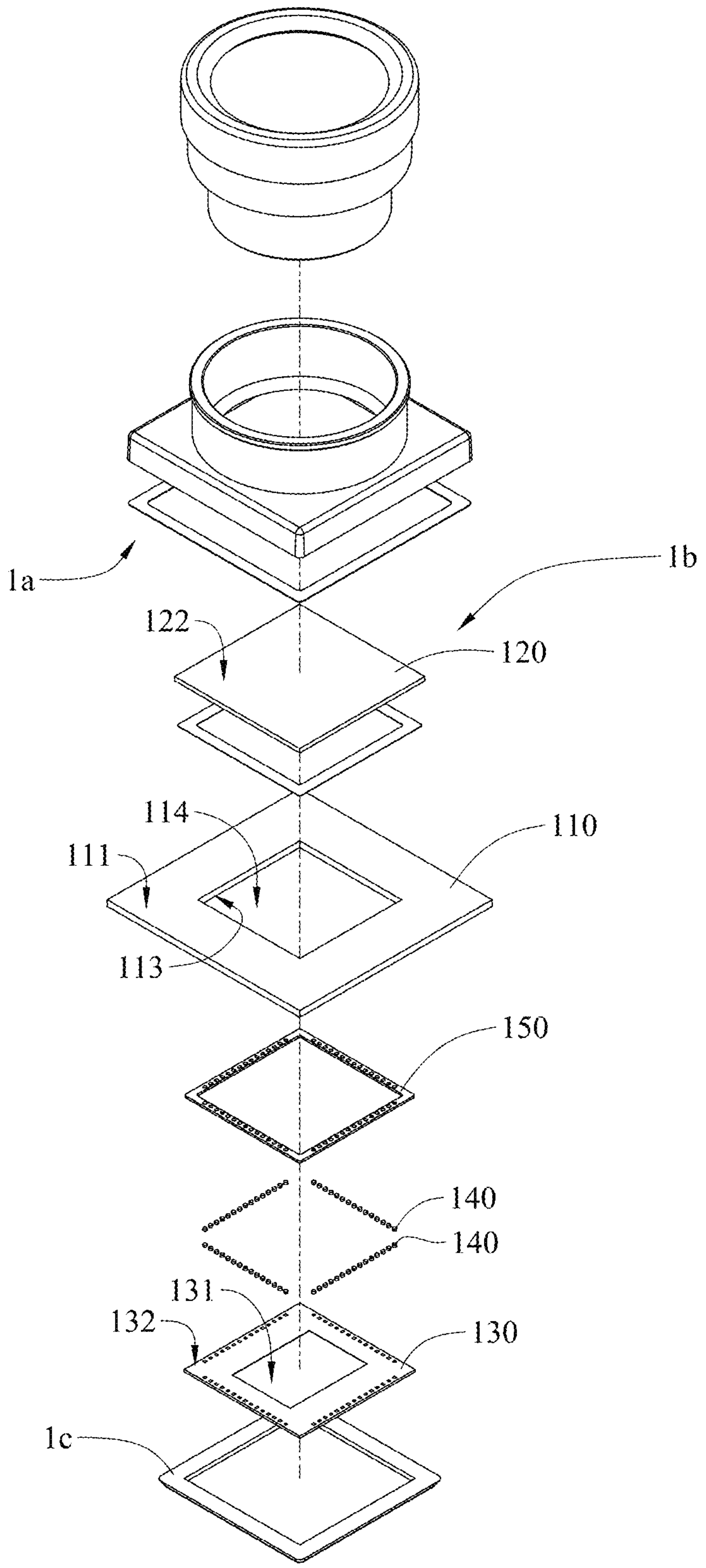
FIG. 2 is an exploded view of the camera module of FIG. 1.
Figure 3:
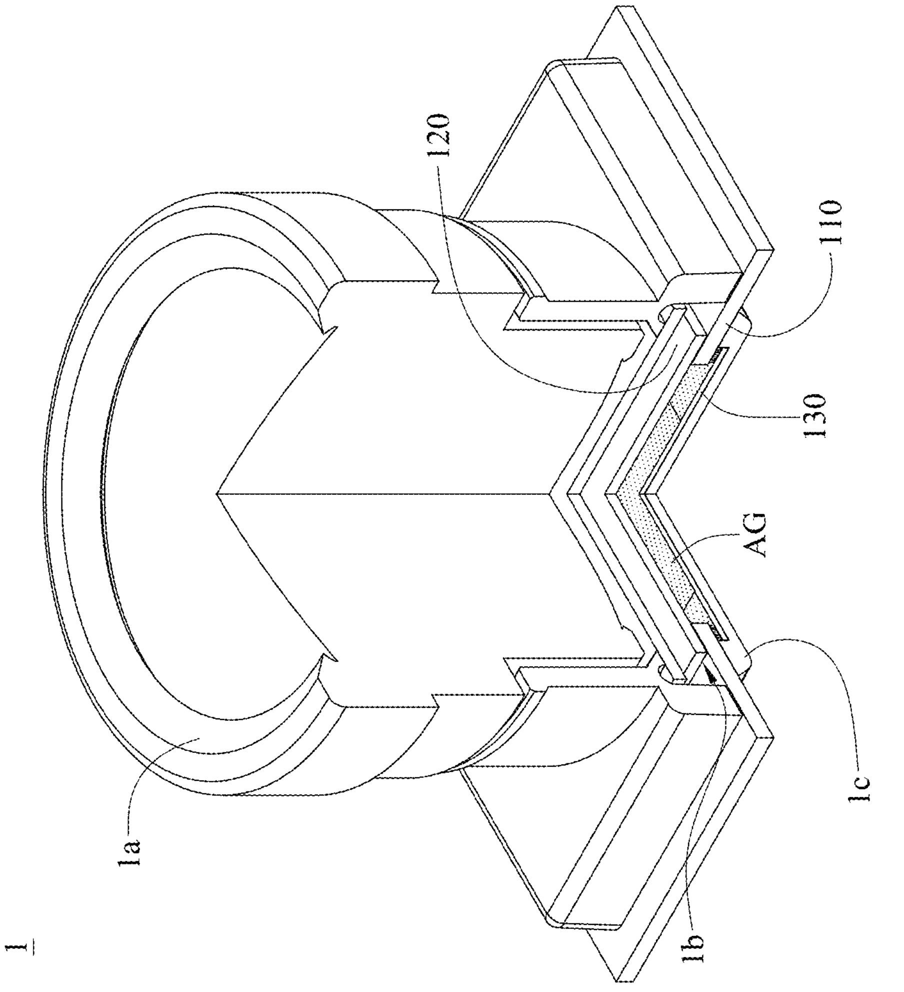
FIG. 3 is a perspective view of the camera module of FIG. 1 that has been partially sectioned.
Figure 4:
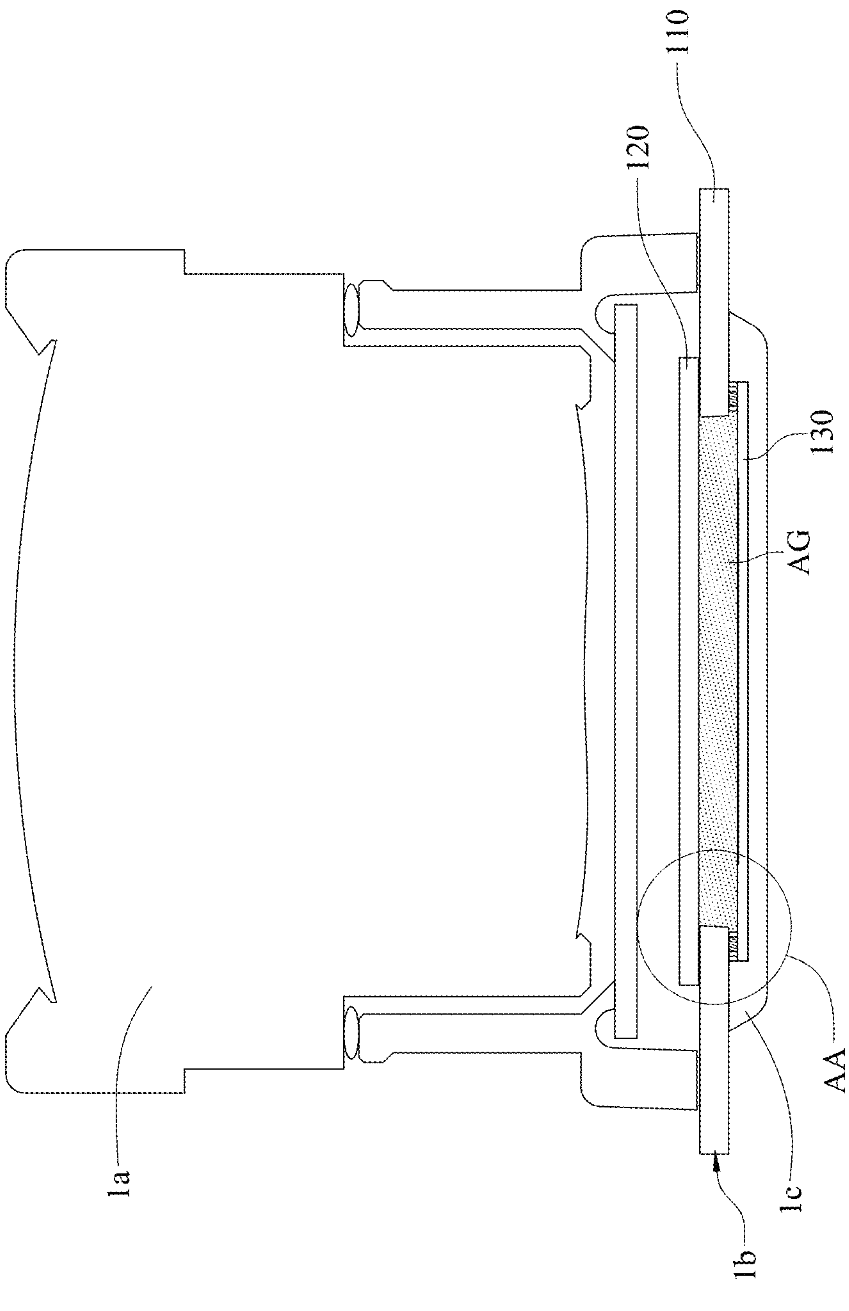
FIG. 4 is a cross-sectional view of the camera module of FIG. 1.
Figure 5:
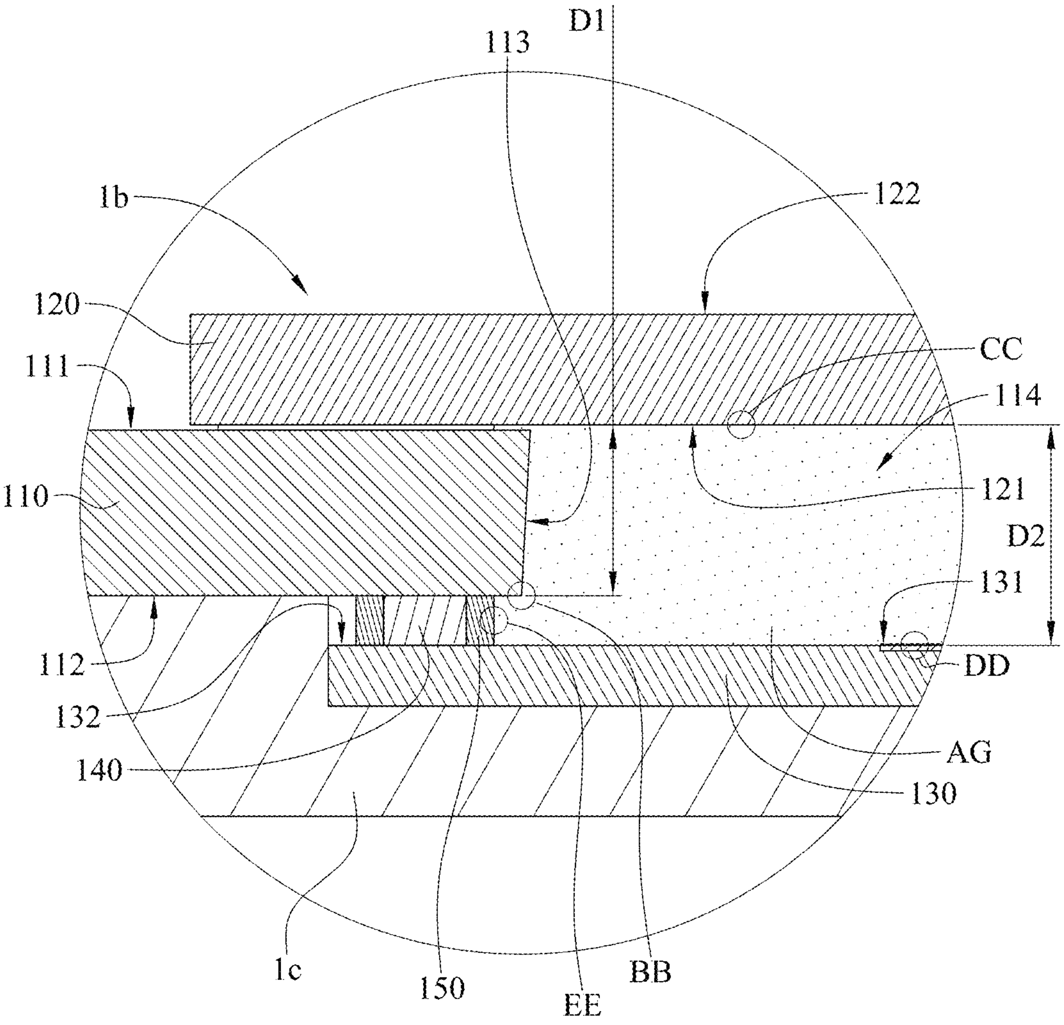
FIG. 5 is an enlarged view of AA region of the camera module of FIG. 4.
Figure 6:
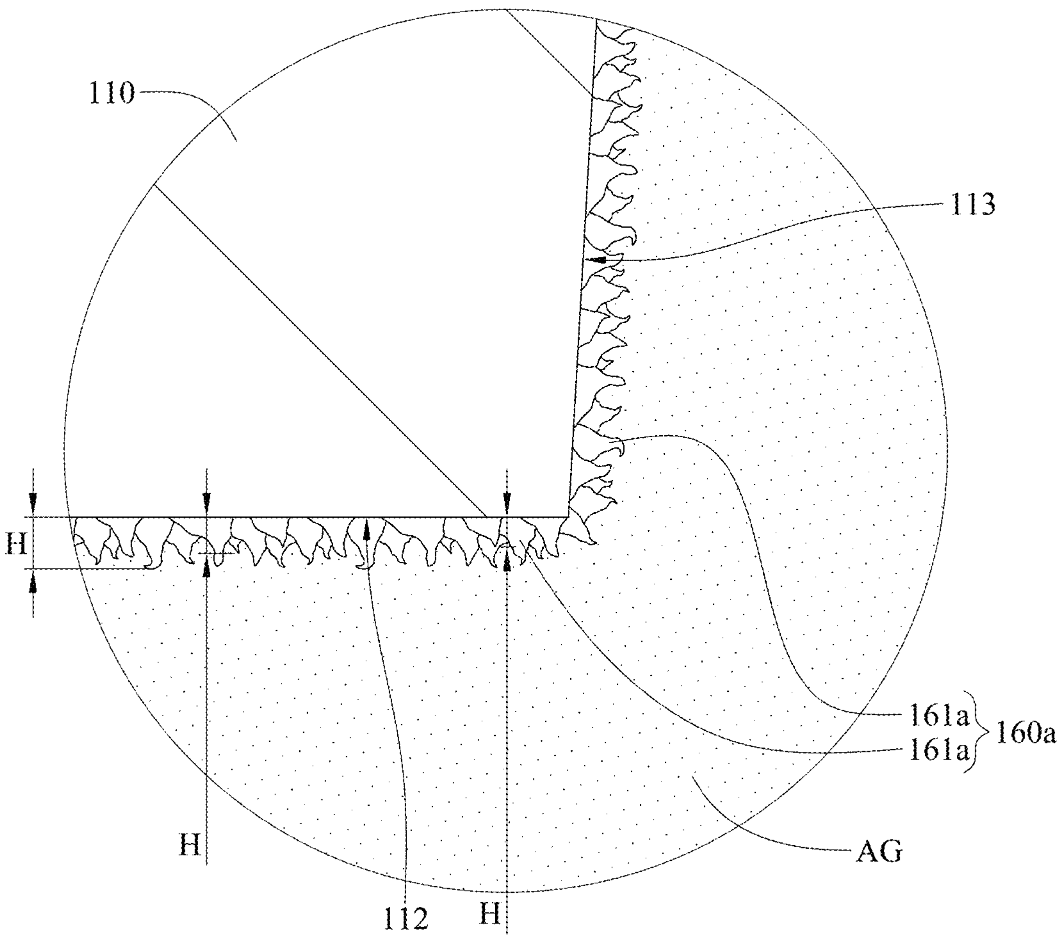
FIG. 6 is an enlarged view of BB region of the camera module of FIG. 5.
Figure 7:
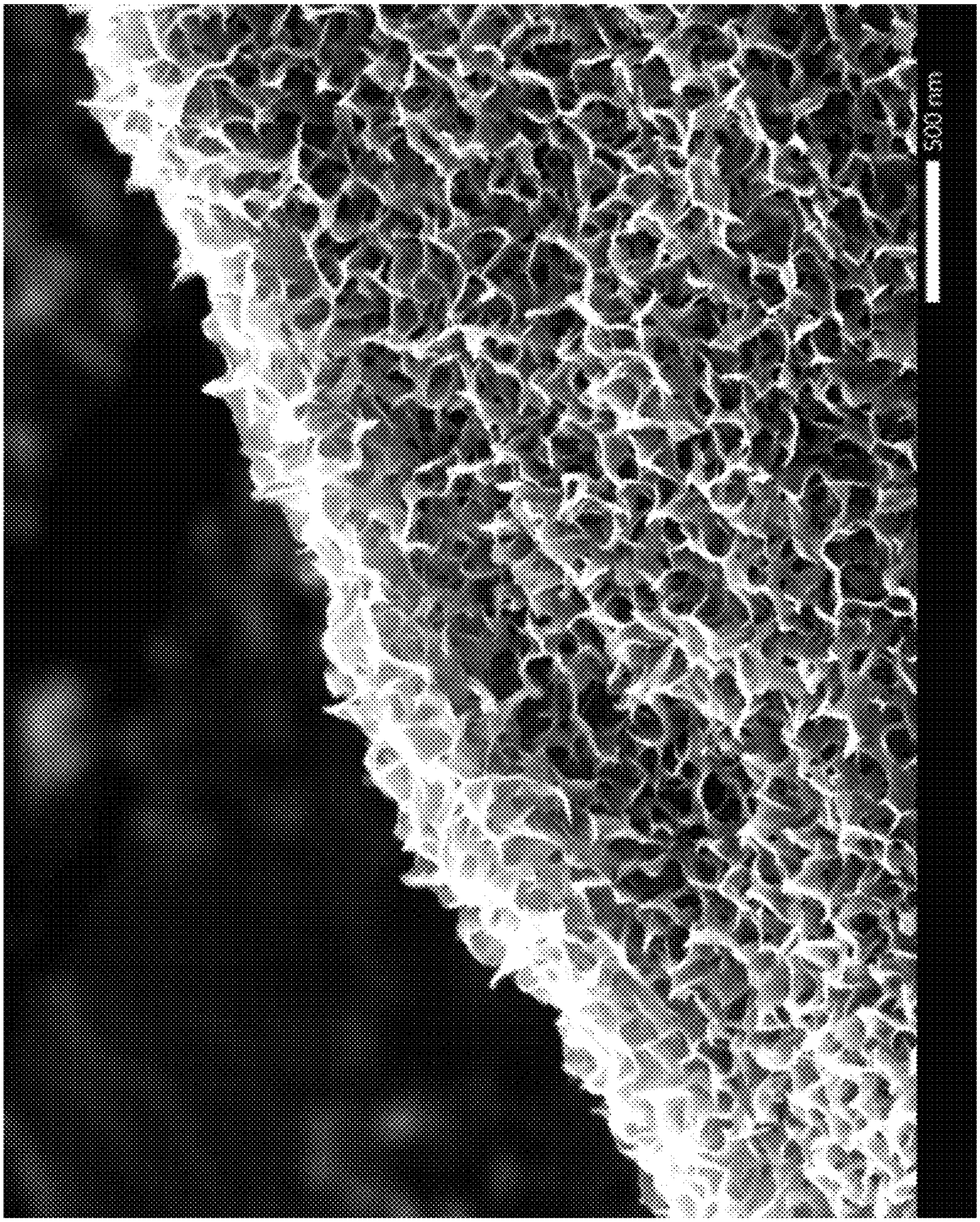
FIG. 7 is a schematic view of partial and enlarged view of the camera module of FIG. 6.
Figure 8:
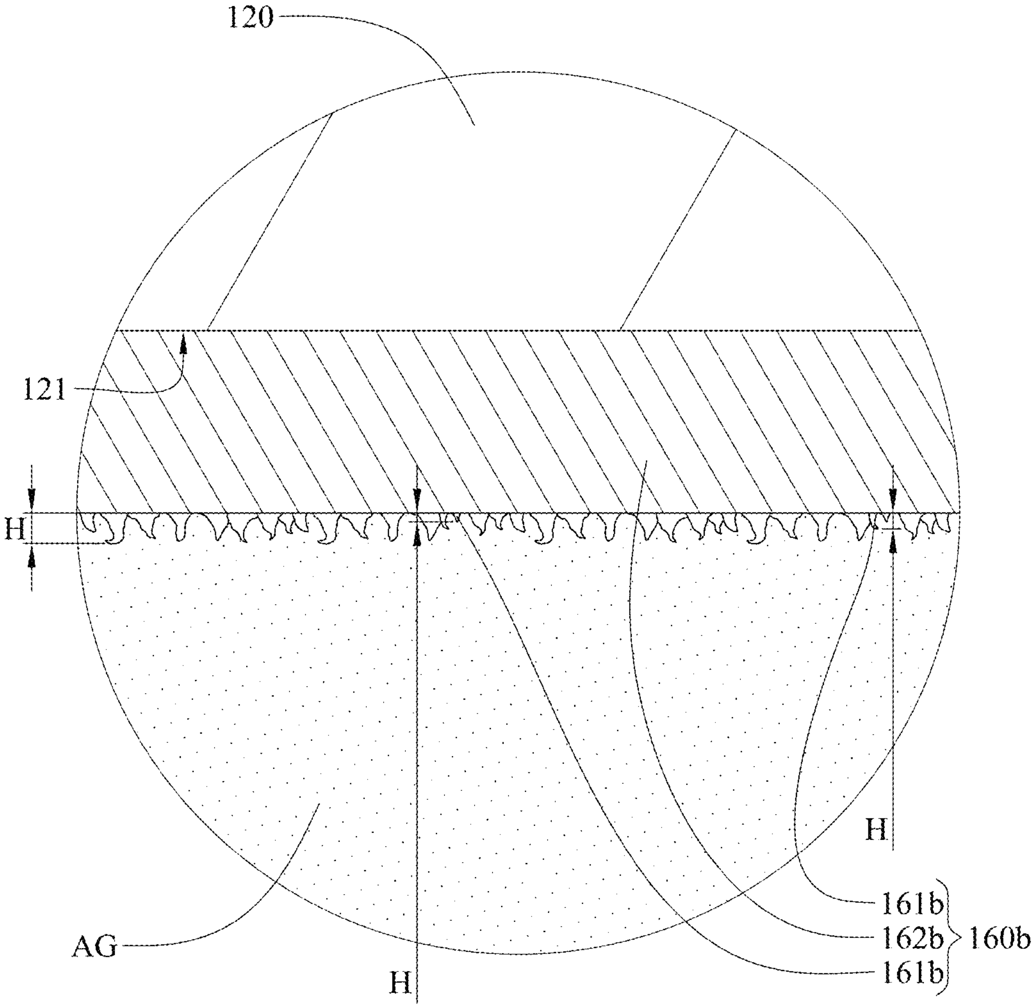
FIG. 8 is an enlarged view of CC region of the camera module of FIG. 5.
Figure 9:
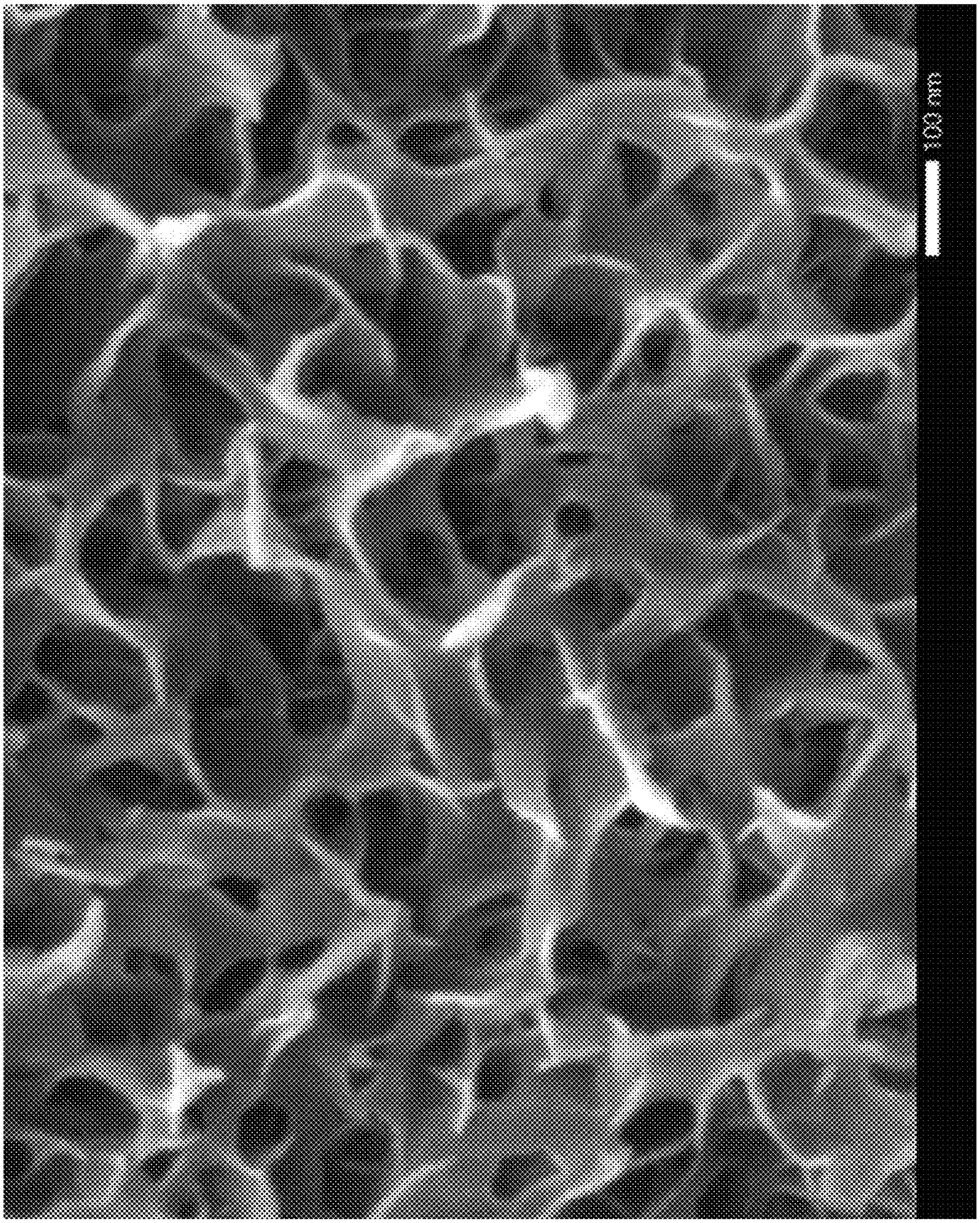
FIG. 9 is a schematic view of partial and enlarged view of the camera module of FIG. 8.
Figure 10:
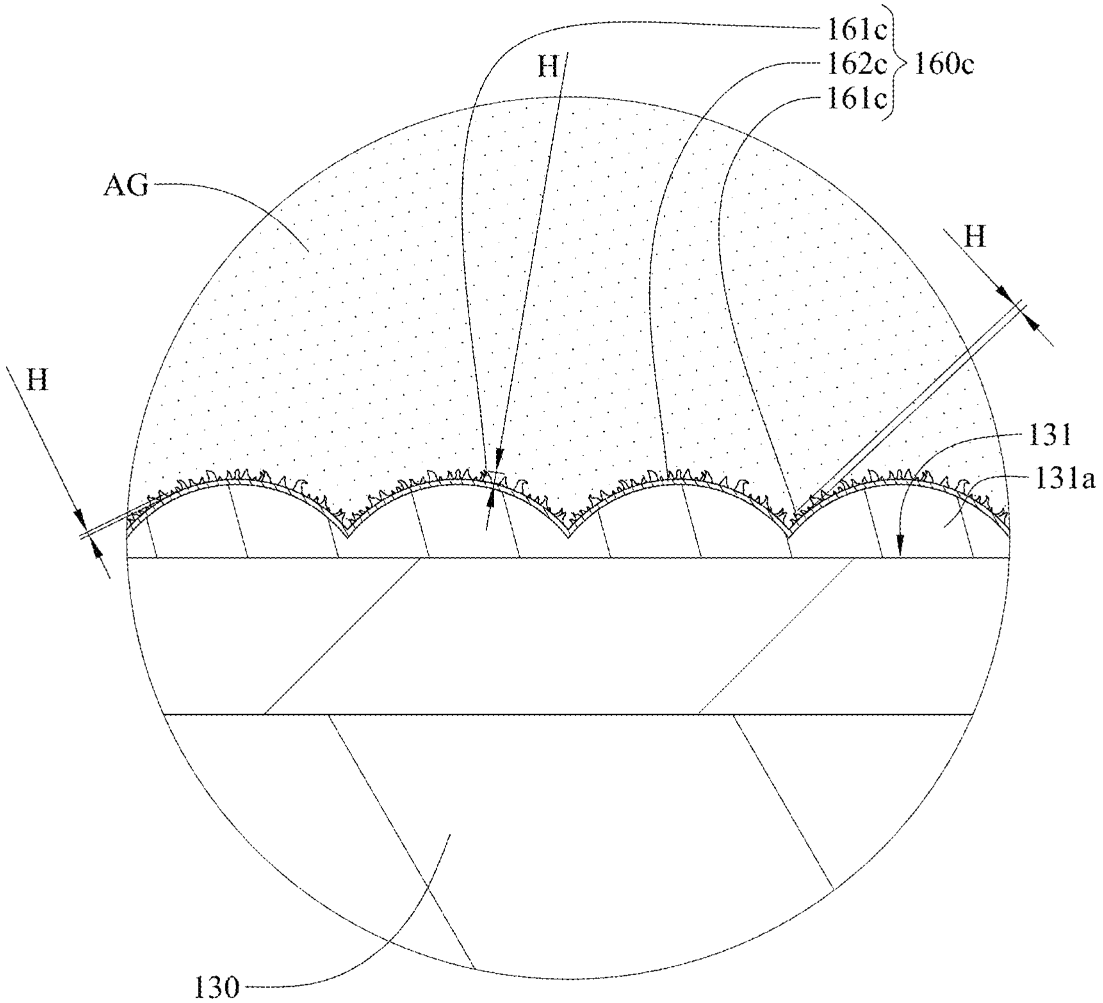
FIG. 10 is an enlarged view of DD region of the camera module of FIG. 5.
Figure 11:
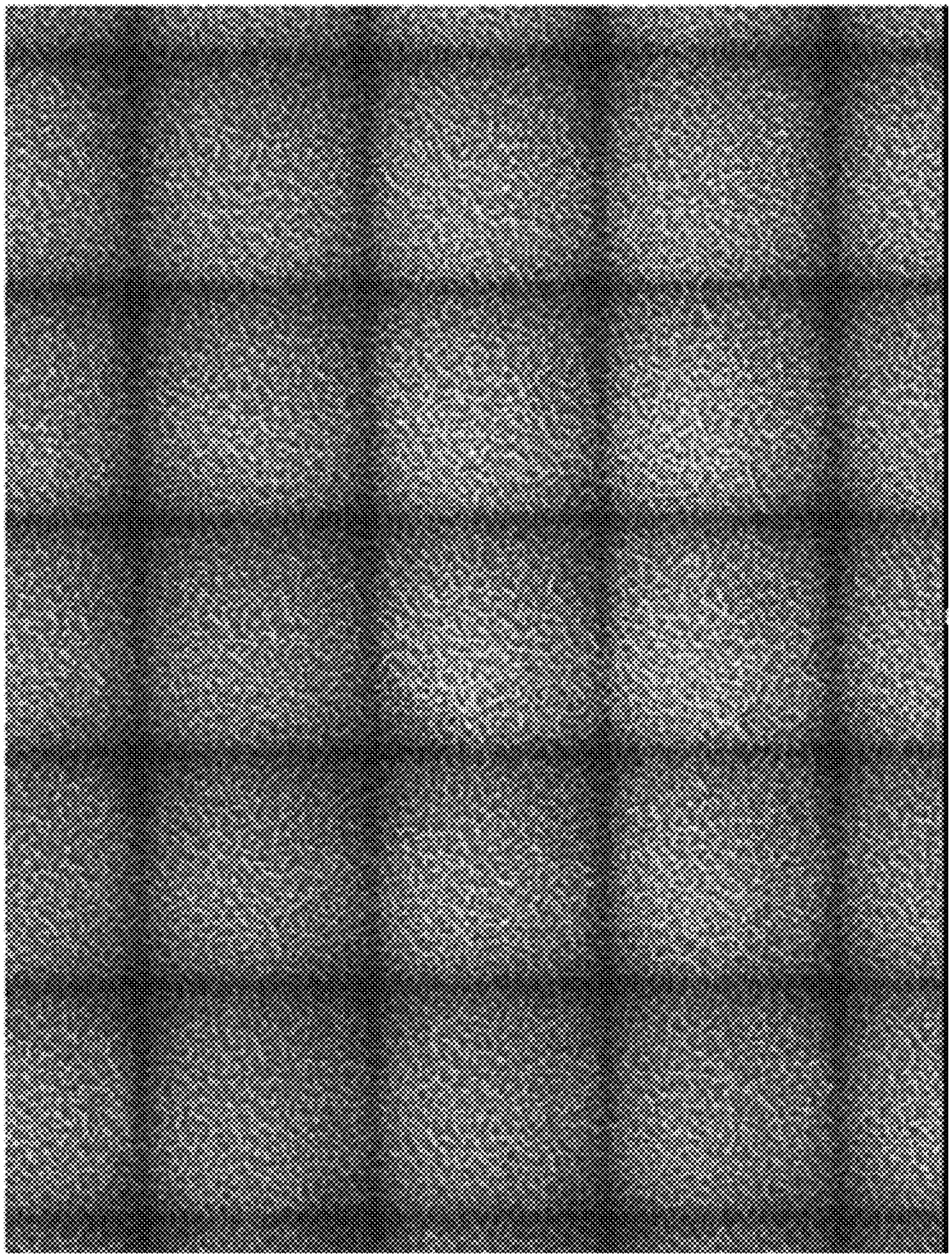
FIG. 11 is a schematic view of partial and enlarged view of the camera module of FIG. 10.
Figure 12:
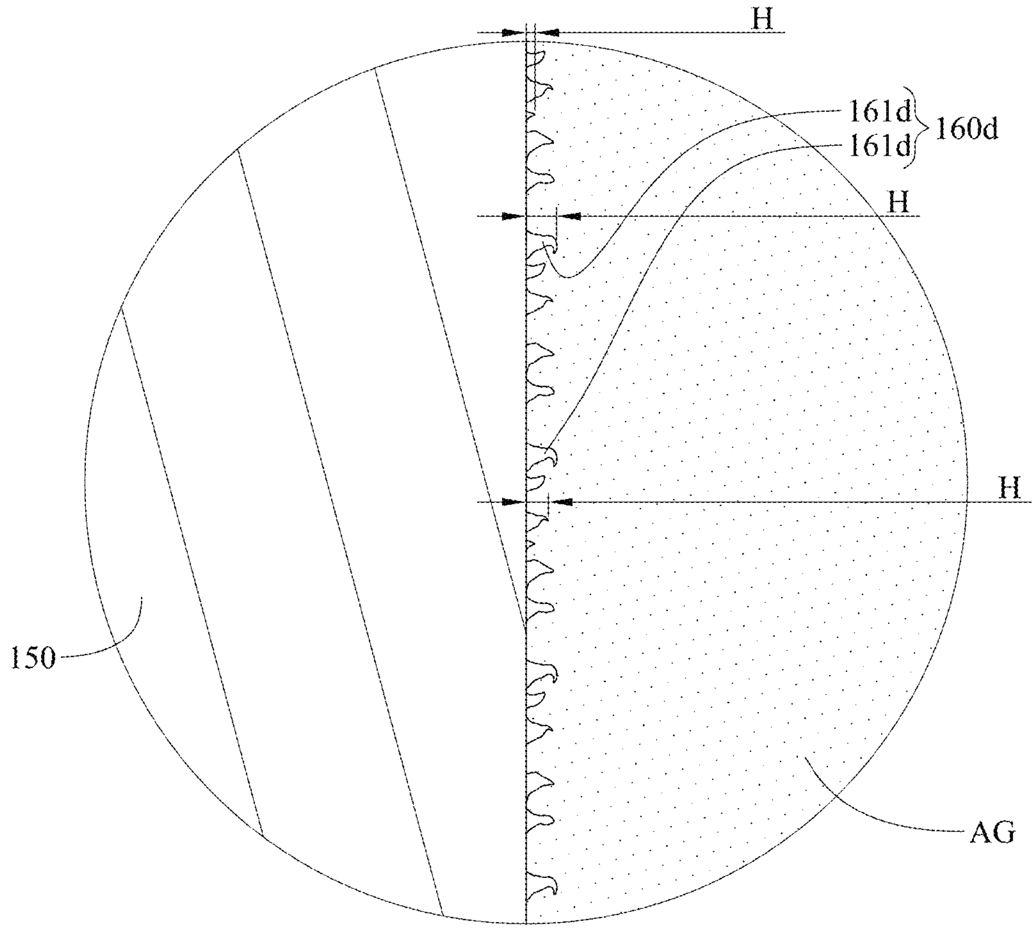
FIG. 12 is an enlarged view of EE region of the camera module of FIG. 5.

Please refer to FIG. 1 to FIG. 12, where FIG. 1 is a perspective view of a camera module according to the 1st embodiment of the present disclosure, FIG. 2 is an exploded view of the camera module of FIG. 1, FIG. 3 is a perspective view of the camera module of FIG. 1 that has been partially sectioned, FIG. 4 is a cross-sectional view of the camera module of FIG. 1, FIG. 5 is an enlarged view of AA region of the camera module of FIG. 4, FIG. 6 is an enlarged view of BB region of the camera module of FIG. 5, FIG. 7 is a schematic view of partial and enlarged view of the camera module of FIG. 6, FIG. 8 is an enlarged view of CC region of the camera module of FIG. 5, FIG. 9 is a schematic view of partial and enlarged view of the camera module of FIG. 8, FIG. 10 is an enlarged view of DD region of the camera module of FIG. 5, FIG. 11 is a schematic view of partial and enlarged view of the camera module of FIG. 10, and FIG. 12 is an enlarged view of EE region of the camera module of FIG. 5.

In this embodiment, a camera module 1 is provided, which includes a lens module 1*a*, an image sensing module 1*b* and a protection layer 1*c*.

The lens module 1*a* is configured for light to pass therethrough. Please be noted that the appearance or the internal structure of the lens module 1*a* are not intended to restrict the present disclosure.

The image sensing module 1*b* is disposed on an image side of the lens module 1*a*. The image sensing module 1*b* includes a circuit substrate 110, an optical flat element 120, a sensing element 130, a plurality of metal protrusions 140, a filling element 150 and a plurality of anti-reflection layers 160*a*-160*d*.

The circuit substrate 110 has an upper surface 111, a lower surface 112, an opening surface 113 and an opening 114. The upper surface 111 and the lower surface 112 are disposed opposite to each other. The opening surface 113 is connected to the upper surface 111 and the lower surface 112. The opening 114 is located at the opening surface 113.

The optical flat element 120 is fixed on the upper surface 111 of the circuit substrate 110. The optical flat element 120 is disposed corresponding to the opening 114 of the circuit substrate 110. The optical flat element 120 has an inner surface 121 and an outer surface 122 disposed opposite to each other.

The sensing element 130 is disposed on the lower surface 112 of the circuit substrate 110, such that the opening 114 of the circuit substrate 110 is located between the sensing element 130 and the optical flat element 120. The sensing element 130 has a sensing surface 131 and a periphery surface 132 disposed surrounding the sensing surface 131. The sensing surface 131 is disposed corresponding to the opening 114 of the circuit substrate 110, and the sensing surface 131 is configured to convert an optical image signal of light passing through the lens module 1*a* into an electrical signal. Moreover, the sensing surface 131 is provided with a micro lens array 131*a* disposed thereon.

The sensing element 130 and the optical flat element 120 form an air gap AG therebetween, such that the opening surface 113 is disposed surrounding the air gap AG, and the inner surface 121 of the optical flat element 120 is disposed facing towards the air gap AG. Please be noted that the boundary of the air gap AG can be defined by three surfaces as the surface of the sensing element 130 facing towards the optical flat element 120 (e.g., the sensing surface 131 or the periphery surface 132), the surface of the optical flat element 120 facing towards the sensing element 130 (e.g., the inner surface 121), and the opening surface 113, but the present disclosure is not limited thereto. Please be noted that the range of the air gap AG is illustrated by screentone.

When a distance between the lower surface 112 of the circuit substrate 110 and the optical flat element 120 is D1, and a thickness of the air gap AG is D2, the following conditions are satisfied: D1=0.31 mm (millimeters); D2=0.4 mm; and D1/D2=0.78.

The metal protrusions 140 as being cylindrical are disposed between the circuit substrate 110 and the sensing element 130, with each metal protrusion 140 electrically connected to the circuit substrate 110 and the sensing element 130. In specific, the metal protrusions 140 are divided into four groups respectively disposed within four areas on the periphery surface 132 of the sensing element 130 on four sides of the periphery surface 132. It can also be considered that the metal protrusions 140 are disposed surrounding the air gap AG.

The filling element 150 is disposed between the circuit substrate 110 and the sensing element 130. The filling element 150 wholly covers each metal protrusion 140, and the filling element 150 surrounds and seals the air gap AG.

The anti-reflection layers 160*a*-160*d* are disposed on at least one surface at the air gap AG. In specific, the anti-reflection layer 160*a* is disposed on the lower surface 112 and the opening surface 113 of the circuit substrate 110, as shown in FIG. 5 and FIG. 6. The anti-reflection layer 160*b* is disposed on the inner surface 121 of the optical flat element 120, as shown in FIG. 5 and FIG. 8. The anti-reflection layer 160*c* is disposed on the micro lens array 131*a* over the sensing surface 131 of the sensing element 130, as shown in FIG. 5 and FIG. 10. The anti-reflection layer 160*d* is disposed on the filling element 150, as shown in FIG. 5 and FIG. 12.

The anti-reflection layer 160*a* includes a plurality of nano-ridge structures 161*a* extending towards the air gap AG from the lower surface 112 and the opening surface 113, and the nano-ridge structures 161*a* are irregularly arranged, as shown in FIG. 6.

When a height of each of any three of the plurality of nano-ridge structures 161*a* chosen for the height measurement is H, the following conditions are satisfied: H=187 nm; 131 nm; and 108 nm, as shown by the labels marked as H sequentially from the left hand side to the right hand side of FIG. 6. Moreover, the enlarged view of the nano-ridge structures 161*a* is shown in FIG. 7.

The anti-reflection layer 160*b* includes a plurality of nano-ridge structures 161*b* and an interlayer 162*b* disposed between the inner surface 121 and the nano-ridge structures 161*b*. The nano-ridge structures 161*b* extend towards the air gap AG from the interlayer 162*b* along a direction from the inner surface 121 to the air gap AG, and the nano-ridge structures 161*b* are irregularly arranged, as shown in FIG. 8. Furthermore, the thickness of the interlayer 162*b* can be greater than the height of the nano-ridge structures 161*b*, and the interlayer 162*b* can have at least one area exposed to the air gap AG.

When a height of each of any three of the plurality of nano-ridge structures 161*b* chosen for the height measurement is H, the following conditions are satisfied: H=165 nm; 48 nm; and 86 nm, as shown by the labels marked as H sequentially from the left hand side to the right hand side of FIG. 8. Moreover, the enlarged view of the nano-ridge structures 161*b* is shown in FIG. 9.

The anti-reflection layer 160*c* includes a plurality of nano-ridge structures 161*c* and an interlayer 162*c* disposed between the micro lens array 131*a* and the nano-ridge structures 161*c*. The nano-ridge structures 161*c* extend towards the air gap AG from the interlayer 162*c* along a direction from the sensing surface 131 to the air gap AG, and the nano-ridge structures 161*c* are irregularly arranged, as shown in FIG. 10. Furthermore, the thickness of the interlayer 162*c* can be greater than the height of the nano-ridge structures 161*c*, and the interlayer 162*c* can have at least one area exposed to the air gap AG.

When a height of each of any three of the plurality of nano-ridge structures 161*c* chosen for the height measurement is H, the following conditions are satisfied: H=32 nm; 99 nm; and 67 nm, as shown by the labels marked as H sequentially from the left hand side to the right hand side of FIG. 10. Moreover, the enlarged view of the nano-ridge structures 161*c* is shown in FIG. 11.

The anti-reflection layer 160*d* includes a plurality of nano-ridge structures 161*d*. The nano-ridge structures 161*d* extend towards the air gap AG from the filling element 150, and the nano-ridge structures 161*d* are irregularly arranged, as shown in FIG. 12.

When a height of each of any three of the plurality of nano-ridge structures 161*d* chosen for the height measurement is H, the following conditions are satisfied: H=64 nm; 221 nm; and 161 nm, as shown by the labels marked as H sequentially from the upper side to the lower side of FIG. 12.

The protection layer 1*c* is disposed on a side of the image sensing module 1*b* away from the lens module 1*a* for protecting the circuit substrate 110, the optical flat element 120, the sensing element 130, the metal protrusions 140, the filling element 150 and the anti-reflection layers 160*a*-160*d* from being affected by external environment.

2nd Embodiment

Figure 13:
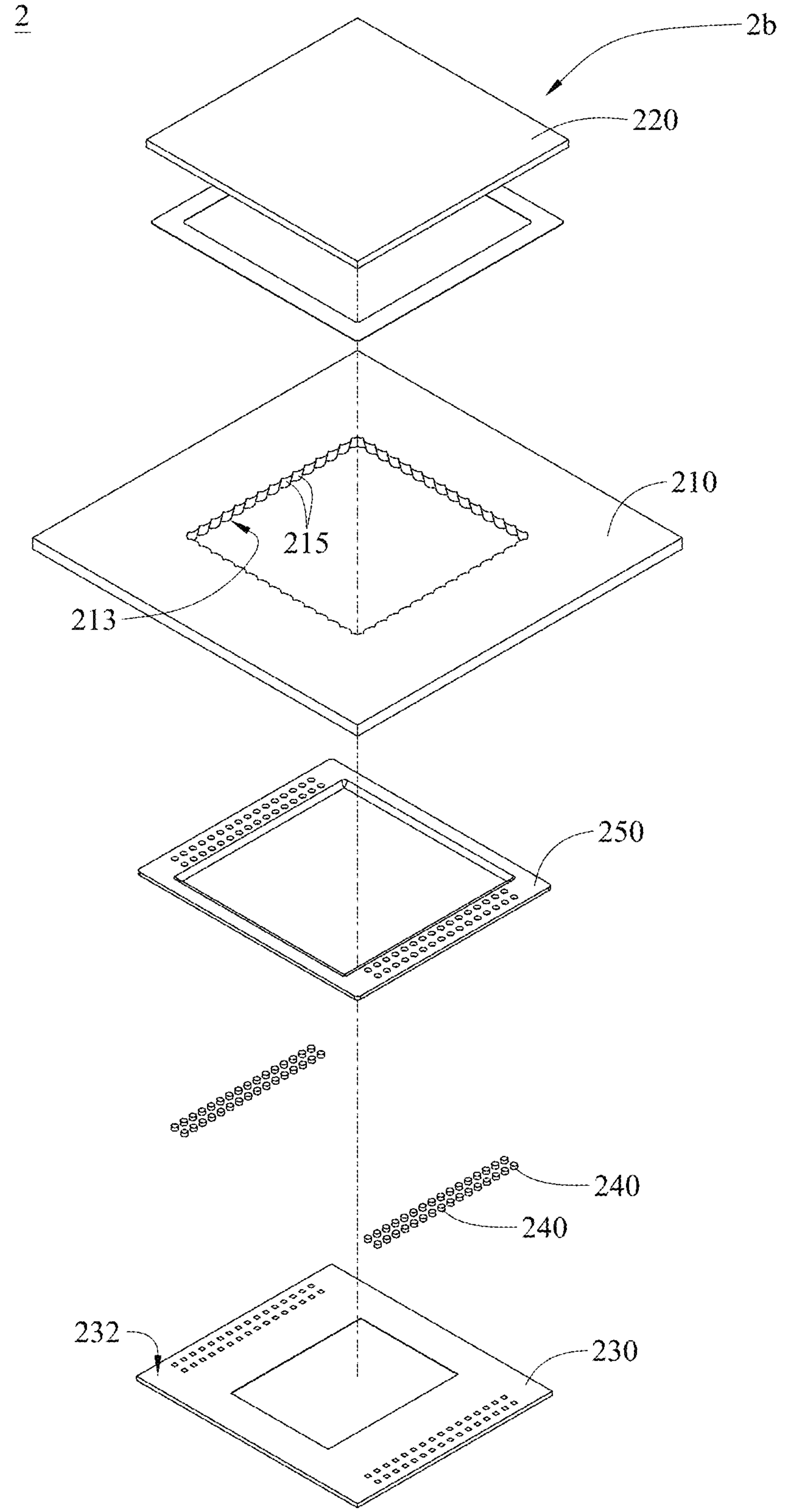
FIG. 13 is an exploded view of a camera module according to the 2nd embodiment of the present disclosure.

Please refer to FIG. 13, which is an exploded view of a camera module according to the 2nd embodiment of the present disclosure.

In this embodiment, a camera module 2 is provided, which includes a lens module (not shown), an image sensing module 2*b* and a protection layer (not shown) that are sequentially disposed.

The image sensing module 2*b* includes a circuit substrate 210, an optical flat element 220, a sensing element 230, a plurality of metal protrusions 240, a filling element 250 and a plurality of anti-reflection layers (not numbered). The circuit substrate 210, the optical flat element 220, the sensing element 230, the metal protrusions 240, the filling element 250 and the anti-reflection layers of the image sensing module 2*b* are respectively similar to the circuit substrate 110, the optical flat element 120, the sensing element 130, the metal protrusions 140, the filling element 150 and the anti-reflection layers 160*a*-160*d* of the image sensing module 1*b*, so only differences between this and previous embodiments would be illustrated hereinafter.

The circuit substrate 210 further has a plurality of anti-flare structures 215 disposed on the opening surface 213 of the circuit substrate 210. Each anti-flare structure 215 tapers off towards the air gap AG from the opening surface 213 to have a rounded end.

The metal protrusions 240 are divided into two groups respectively disposed within two areas on the periphery surface 232 of the sensing element 230 on two opposite sides of the periphery surface 232, with the metal protrusions 240 in each group arranged in two rows and aligned with each other. Moreover, the sensing element 230 and the filling element 250 have structures different from the sensing element 130 and the filling element 150 for corresponding to the arrangement of the metal protrusions 240.

3rd Embodiment

Figure 14:
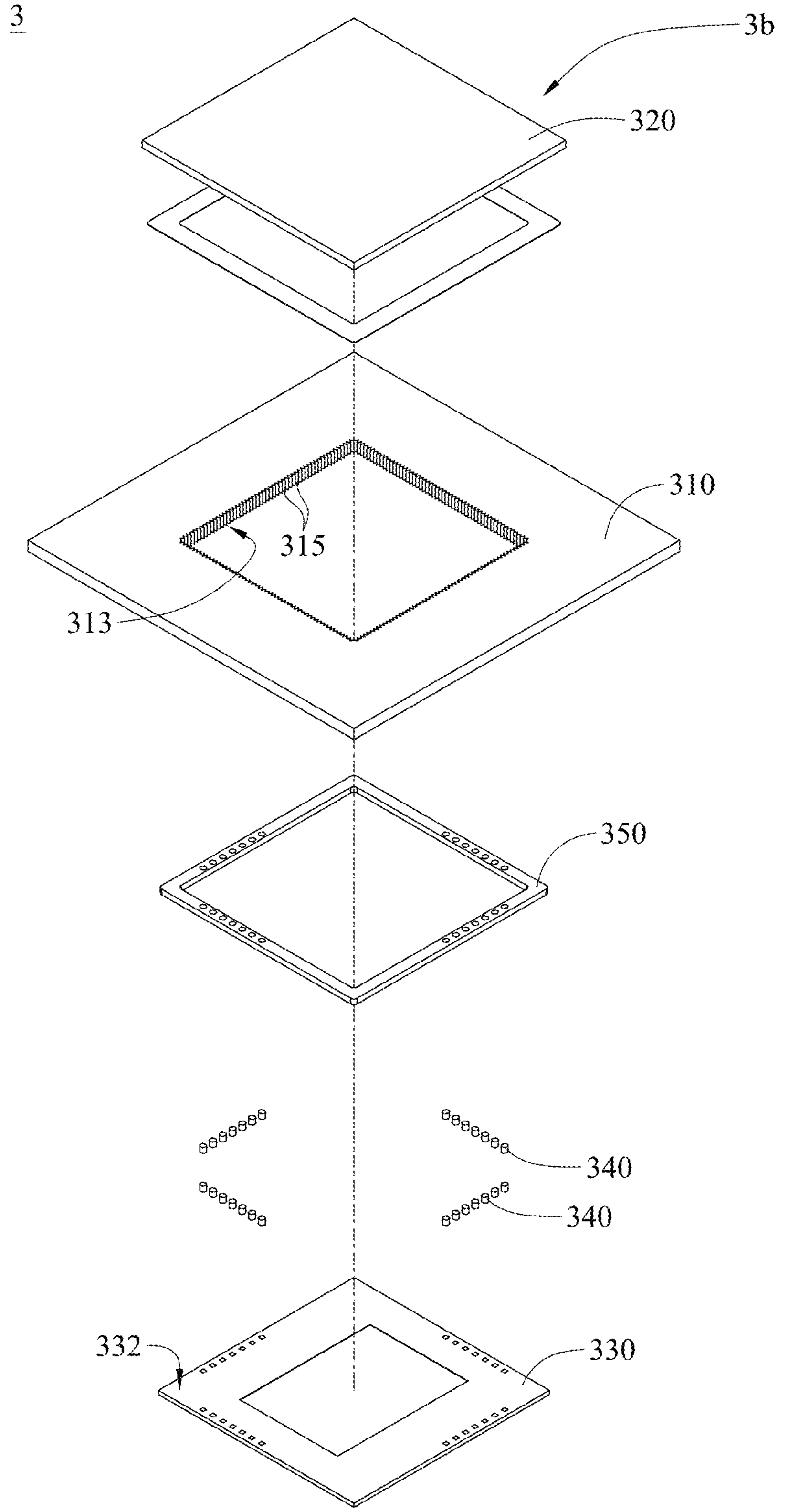
FIG. 14 is an exploded view of a camera module according to the 3rd embodiment of the present disclosure.

Please refer to FIG. 14, which is an exploded view of a camera module according to the 3rd embodiment of the present disclosure.

In this embodiment, a camera module 3 is provided, which includes a lens module (not shown), an image sensing module 3*b* and a protection layer (not shown) that are sequentially disposed.

The image sensing module 3*b* includes a circuit substrate 310, an optical flat element 320, a sensing element 330, a plurality of metal protrusions 340, a filling element 350 and a plurality of anti-reflection layers (not numbered). The circuit substrate 310, the optical flat element 320, the sensing element 330, the metal protrusions 340, the filling element 350 and the anti-reflection layers of the image sensing module 3*b* are respectively similar to the circuit substrate 110, the optical flat element 120, the sensing element 130, the metal protrusions 140, the filling element 150 and the anti-reflection layers 160*a*-160*d* of the image sensing module 1*b*, so only differences between this and the 1st embodiments would be illustrated hereinafter.

The circuit substrate 310 further has a plurality of anti-flare structures 315 disposed on the opening surface 313 of the circuit substrate 310. Each anti-flare structure 315 tapers off towards the air gap AG from the opening surface 313 to have a sharp end.

The metal protrusions 340 are divided into four groups respectively disposed within four areas on the periphery surface 332 of the sensing element 330 on four sides of the periphery surface 332, with the metal protrusions 340 in each group arranged offset from the center of the side of the periphery surface 332. Moreover, the sensing element 330 and the filling element 350 have structures different from the sensing element 130 and the filling element 150 for corresponding to the arrangement of the metal protrusions 340.

4th Embodiment

Figure 15:
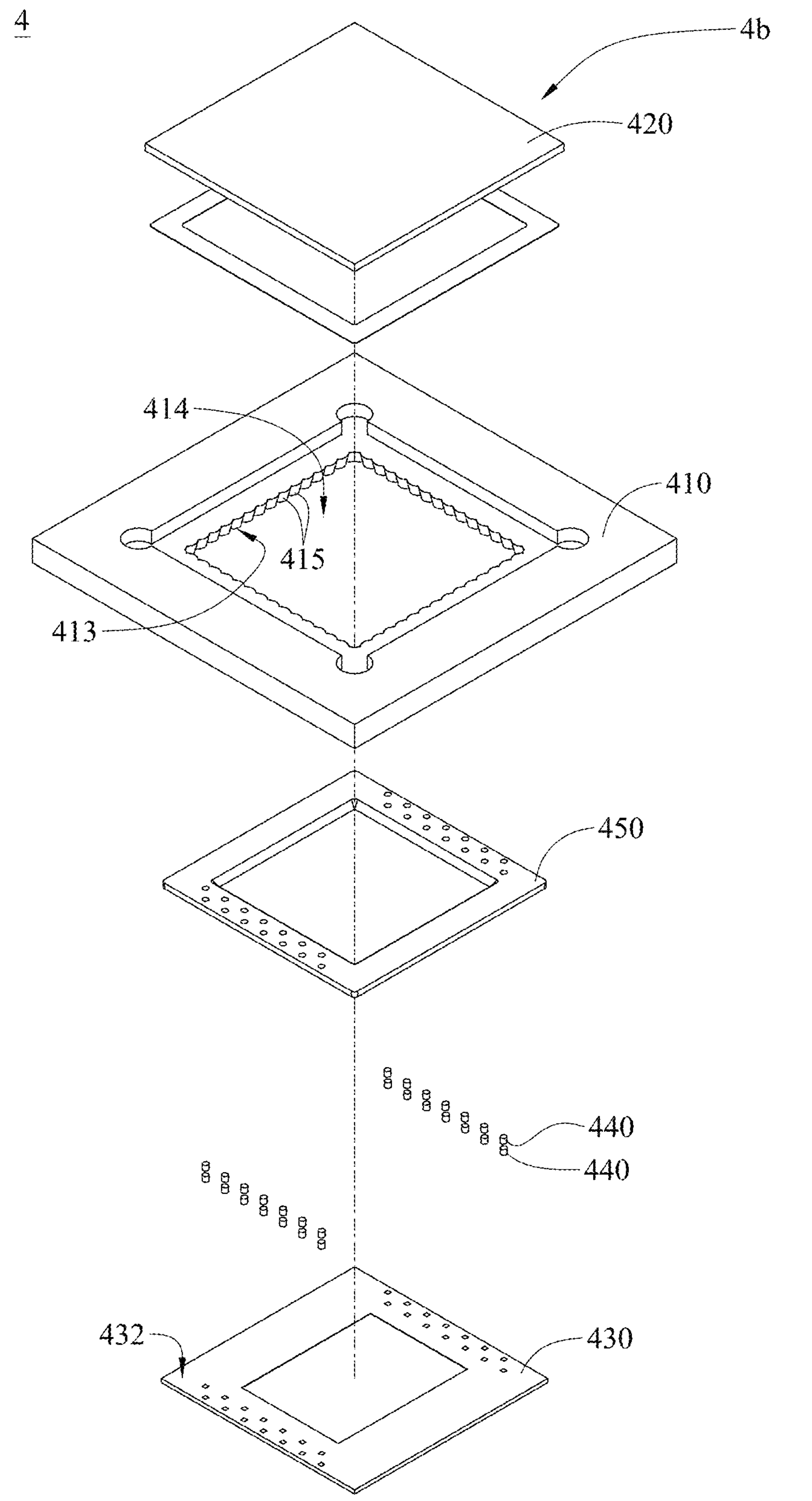
FIG. 15 is an exploded view of a camera module according to the 4th embodiment of the present disclosure.

Please refer to FIG. 15, which is an exploded view of a camera module according to the 4th embodiment of the present disclosure.

In this embodiment, a camera module 4 is provided, which includes a lens module (not shown), an image sensing module 4*b* and a protection layer (not shown) that are sequentially disposed.

The image sensing module 4*b* includes a circuit substrate 410, an optical flat element 420, a sensing element 430, a plurality of metal protrusions 440, a filling element 450 and a plurality of anti-reflection layers (not numbered). The circuit substrate 410, the optical flat element 420, the sensing element 430, the metal protrusions 440, the filling element 450 and the anti-reflection layers of the image sensing module 4*b* are respectively similar to the circuit substrate 110, the optical flat element 120, the sensing element 130, the metal protrusions 140, the filling element 150 and the anti-reflection layers 160*a*-160*d* of the image sensing module 1*b*, so only differences between this and the 1st embodiments would be illustrated hereinafter.

The circuit substrate 410 is has steps in structure at the opening 414. The circuit substrate 410 further has a plurality of anti-flare structures 415 disposed on the opening surface 413 of the circuit substrate 410 at one of the said steps. Each anti-flare structure 415 tapers off towards the air gap AG from the opening surface 413 to have a rounded end.

The metal protrusions 440 are divided into two groups respectively disposed within two areas on the periphery surface 432 of the sensing element 430 on two opposite sides of the periphery surface 432, with the metal protrusions 440 in each group alternatively arranged in two rows. Moreover, the sensing element 430 and the filling element 450 have structures different from the sensing element 130 and the filling element 150 for corresponding to the arrangement of the metal protrusions 440.

5th Embodiment

Figure 16:
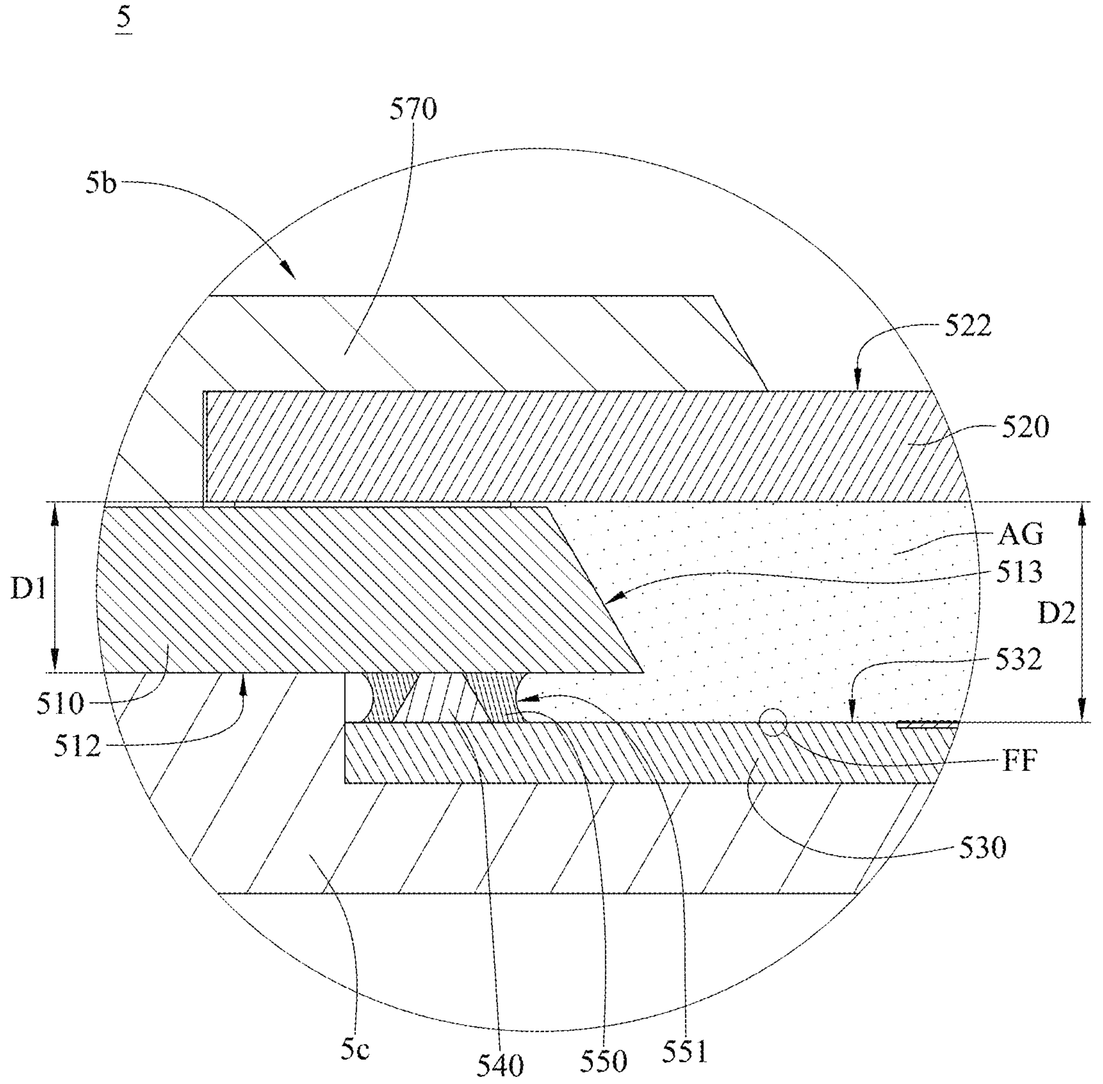
FIG. 16 is a cross-sectional view of partial region of a camera module according to the 5th embodiment of the present disclosure.
Figure 17:
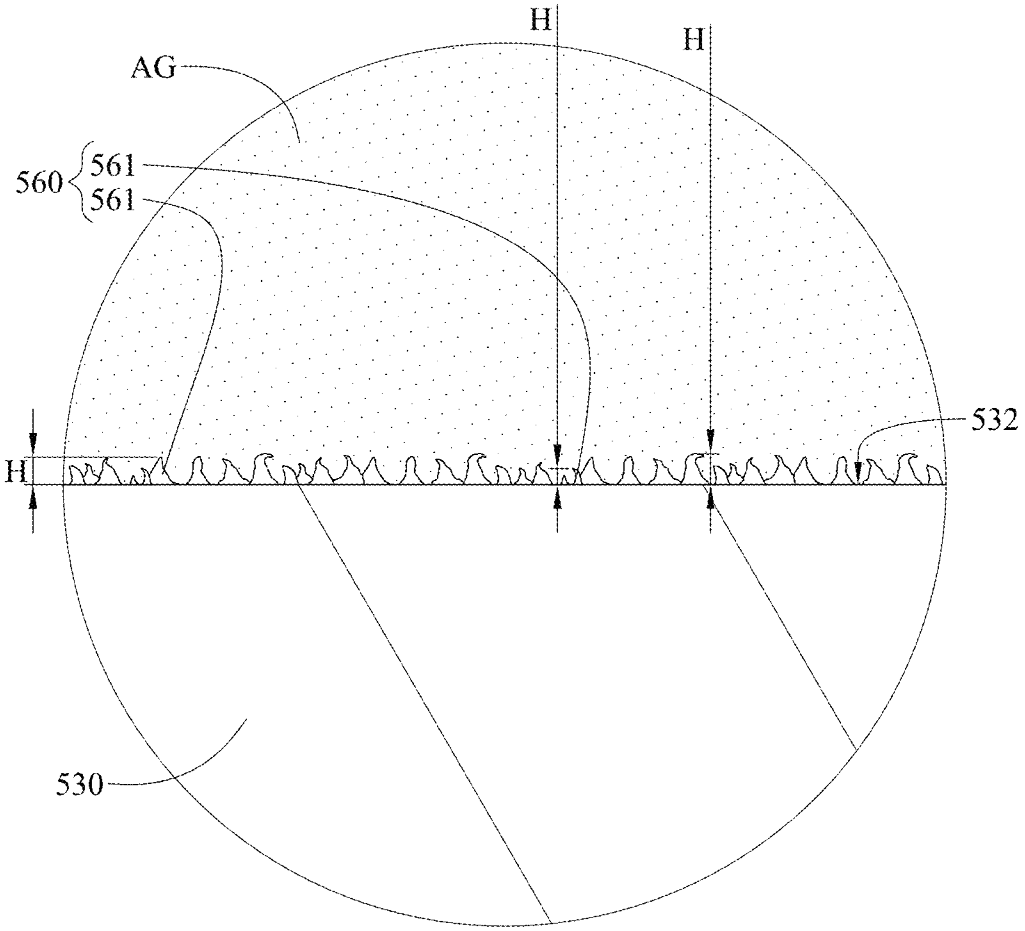
FIG. 17 is an enlarged view of FF region of the camera module of FIG. 16.

Please refer to FIG. 16 and FIG. 17, where FIG. 16 is a cross-sectional view of partial region of a camera module according to the 5th embodiment of the present disclosure, and FIG. 17 is an enlarged view of FF region of the camera module of FIG. 16.

In this embodiment, a camera module 5 is provided, which includes a lens module (not shown), an image sensing module 5*b* and a protection layer 5*c* that are sequentially disposed.

The image sensing module 5*b* includes a circuit substrate 510, an optical flat element 520, a sensing element 530, a plurality of metal protrusions 540, a filling element 550 and an anti-reflection layer 560. The circuit substrate 510, the optical flat element 520, the sensing element 530, the metal protrusions 540, the filling element 550 and the anti-reflection layer 560 of the image sensing module 5*b* are respectively similar to the circuit substrate 110, the optical flat element 120, the sensing element 130, the metal protrusions 140, the filling element 150 and the anti-reflection layers 160*a*-160*d* of the image sensing module 1*b*, so only differences between this and the 1st embodiments would be illustrated hereinafter.

The opening surface 513 of the circuit substrate 510 is an inclined surface facing towards the optical flat element 520. The metal protrusions 540 are conical. The filling element 550 has a plurality of curved surfaces 551 as being concave.

When a distance between the lower surface 512 of the circuit substrate 510 and the optical flat element 520 is D1, and a thickness of the air gap AG is D2, the following conditions are satisfied: D1=0.31 mm; D2=0.4 mm; and D1/D2=0.78.

The anti-reflection layer 560 is disposed on the periphery surface 532 of the sensing element 530, as shown in FIG. 16 and FIG. 17. The anti-reflection layer 560 includes a plurality of nano-ridge structures 561 extending towards the air gap AG from the periphery surface 532, and the nano-ridge structures 561 are irregularly arranged, as shown in FIG. 17.

When a height of each of any three of the plurality of nano-ridge structures 561 chosen for the height measurement is H, the following conditions are satisfied: H=129 nm; 75 nm; and 145 nm, as shown by the labels marked as H sequentially from the left hand side to the right hand side of FIG. 17.

The image sensing module 5*b* further includes a light-blocking element 570 disposed on the outer surface 522 of the optical flat element 520. The light-blocking element 570 has an inclined surface facing away from the optical flat element 520 for blocking part of light from the lens module.

6th Embodiment

Figure 18:
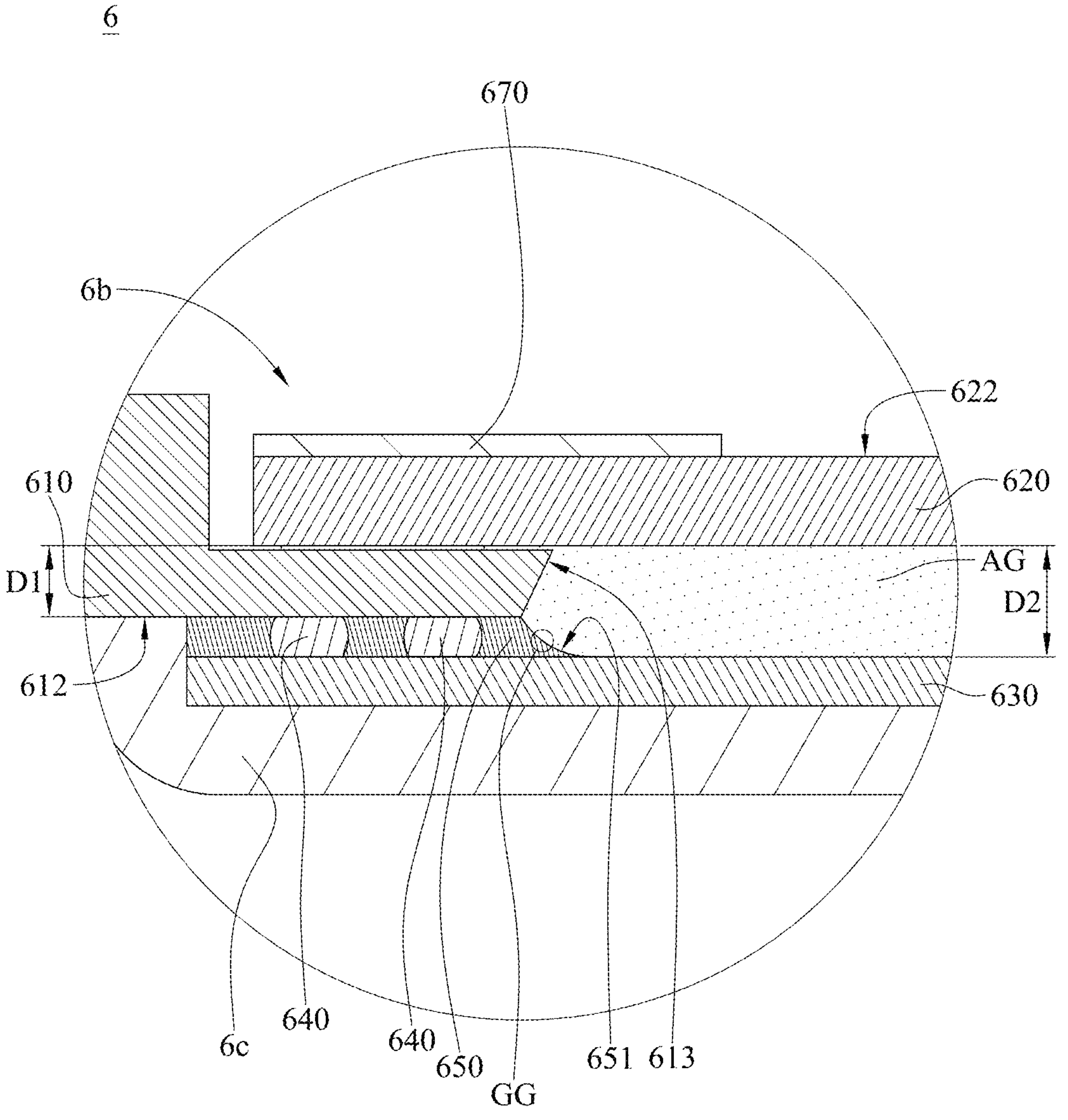
FIG. 18 is a cross-sectional view of partial region of a camera module according to the 6th embodiment of the present disclosure.
Figure 19:
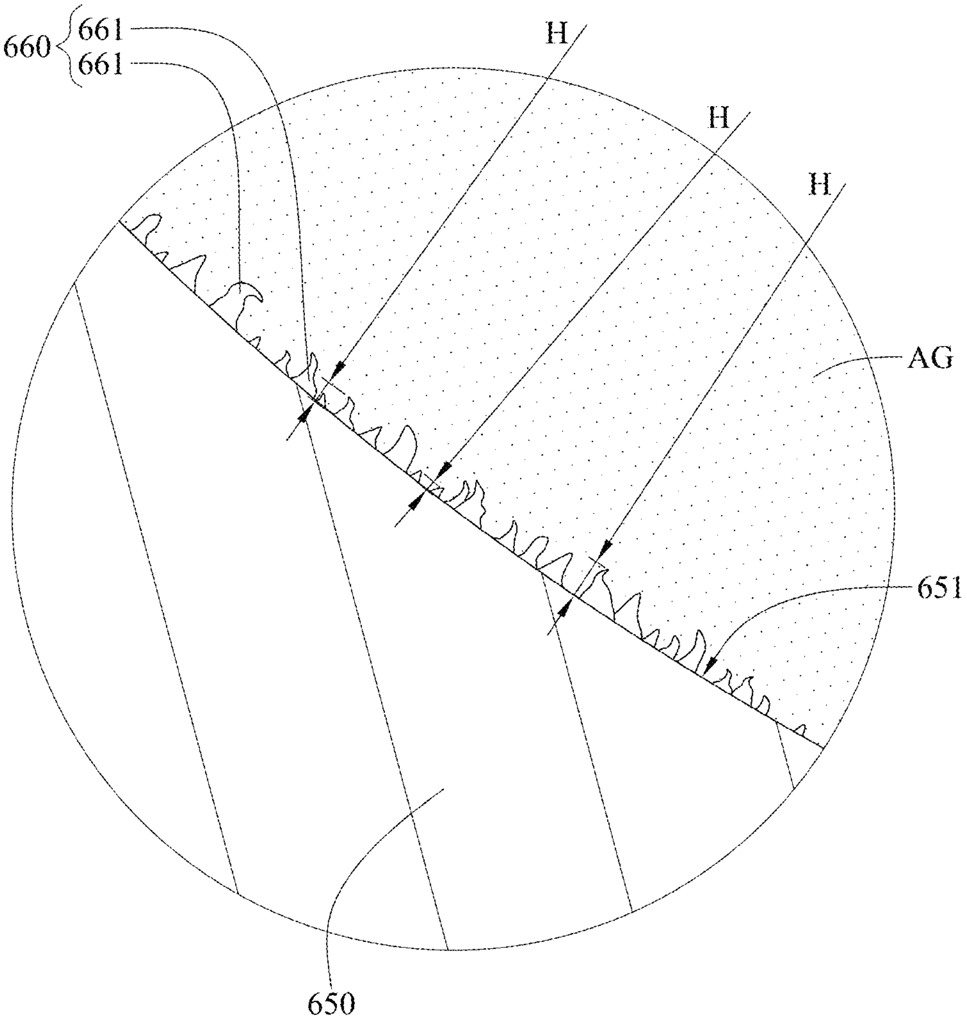
FIG. 19 is an enlarged view of GG region of the camera module of FIG. 18.

Please refer to FIG. 18 and FIG. 19, where FIG. 18 is a cross-sectional view of partial region of a camera module according to the 6th embodiment of the present disclosure, and FIG. 19 is an enlarged view of GG region of the camera module of FIG. 18.

In this embodiment, a camera module 6 is provided, which includes a lens module (not shown), an image sensing module 6*b* and a protection layer 6*c* that are sequentially disposed.

The image sensing module 6*b* includes a circuit substrate 610, an optical flat element 620, a sensing element 630, a plurality of metal protrusions 640, a filling element 650 and an anti-reflection layer 660. The circuit substrate 610, the optical flat element 620, the sensing element 630, the metal protrusions 640, the filling element 650 and the anti-reflection layer 660 of the image sensing module 6*b* are respectively similar to the circuit substrate 110, the optical flat element 120, the sensing element 130, the metal protrusions 140, the filling element 150 and the anti-reflection layers 160*a*-160*d* of the image sensing module 1*b*, so only differences between this and the 1st embodiments would be illustrated hereinafter.

The opening surface 613 of the circuit substrate 610 is an inclined surface facing towards the sensing element 630. The metal protrusions 640 are spherical. The filling element 650 has a curved surface 651 which is concave and faces the optical flat element 620.

When a distance between the lower surface 612 of the circuit substrate 610 and the optical flat element 620 is D1, and a thickness of the air gap AG is D2, the following conditions are satisfied: D1=0.16 mm; D2=0.25 mm; and D1/D2=0.64.

The anti-reflection layer 660 is disposed on the curved surface 651 of the filling element 650, as shown in FIG. 18 and FIG. 19. The anti-reflection layer 660 includes a plurality of nano-ridge structures 661 extending towards the air gap AG from the curved surface 651, and the nano-ridge structures 661 are irregularly arranged, as shown in FIG. 19.

When a height of each of any three of the plurality of nano-ridge structures 661 chosen for the height measurement is H, the following conditions are satisfied: H=111 nm; 50 nm; and 189 nm, as shown by the labels marked as H sequentially from the left hand side to the right hand side of FIG. 19.

The image sensing module 6*b* further includes a light-blocking element 670 disposed on the outer surface 622 of the optical flat element 620 for blocking part of light from the lens module.

7th Embodiment

Figure 20:
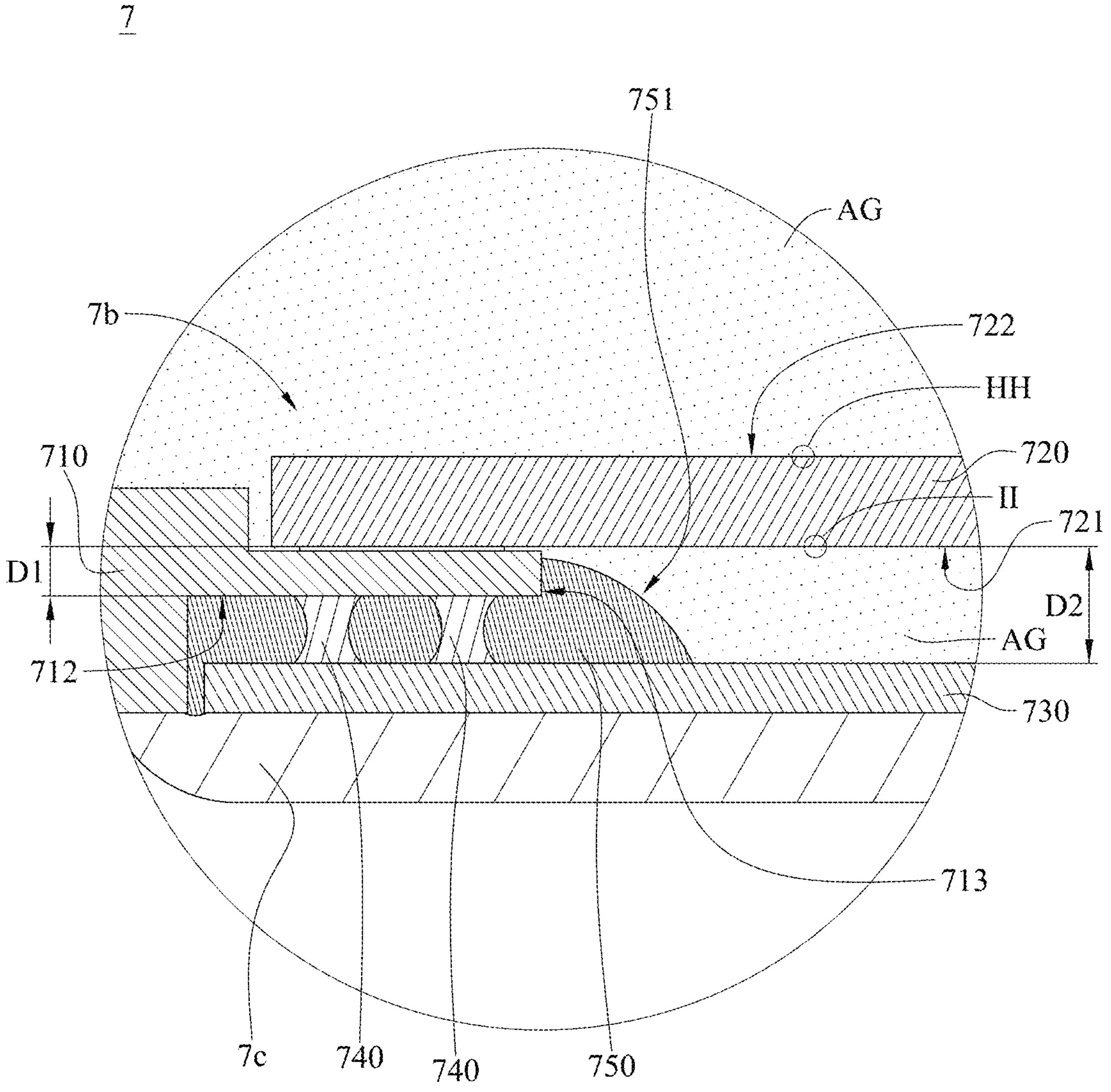
FIG. 20 is a cross-sectional view of partial region of a camera module according to the 7th embodiment of the present disclosure.
Figure 21:
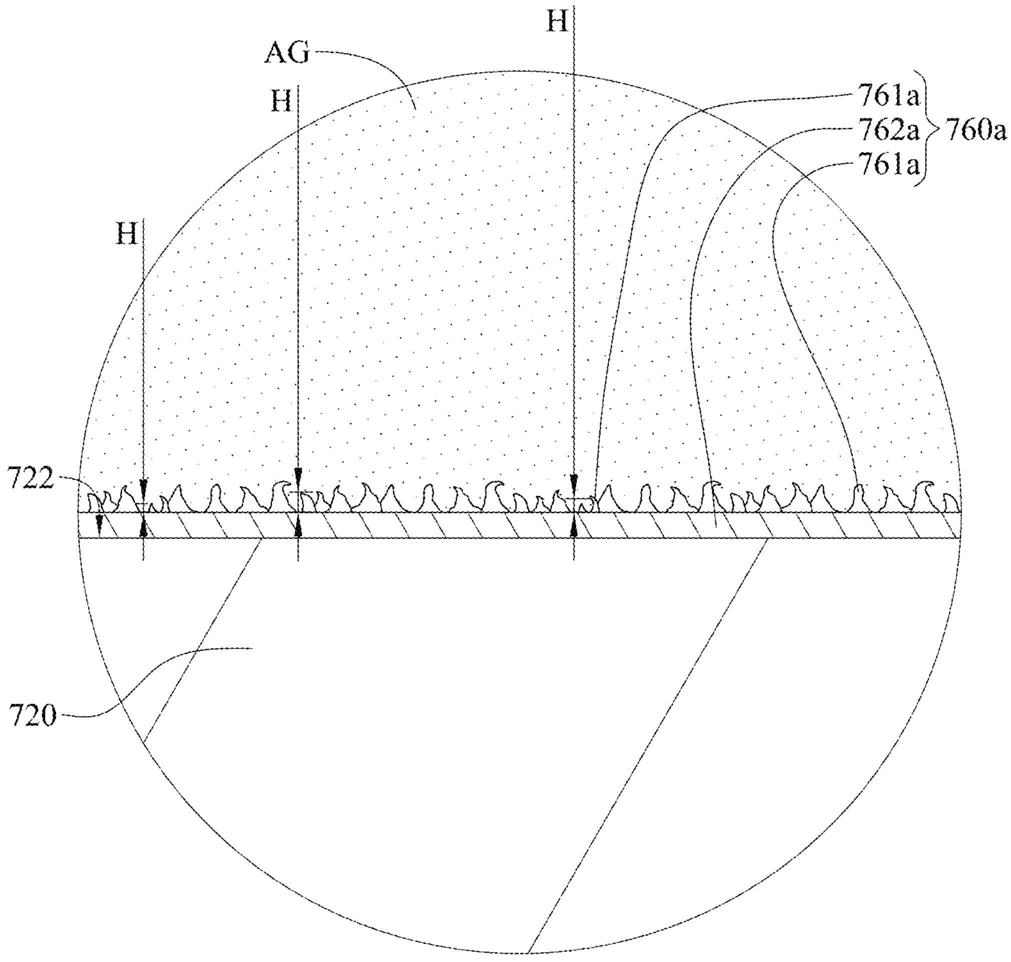
FIG. 21 is an enlarged view of HH region of the camera module of FIG. 20.
Figure 22:
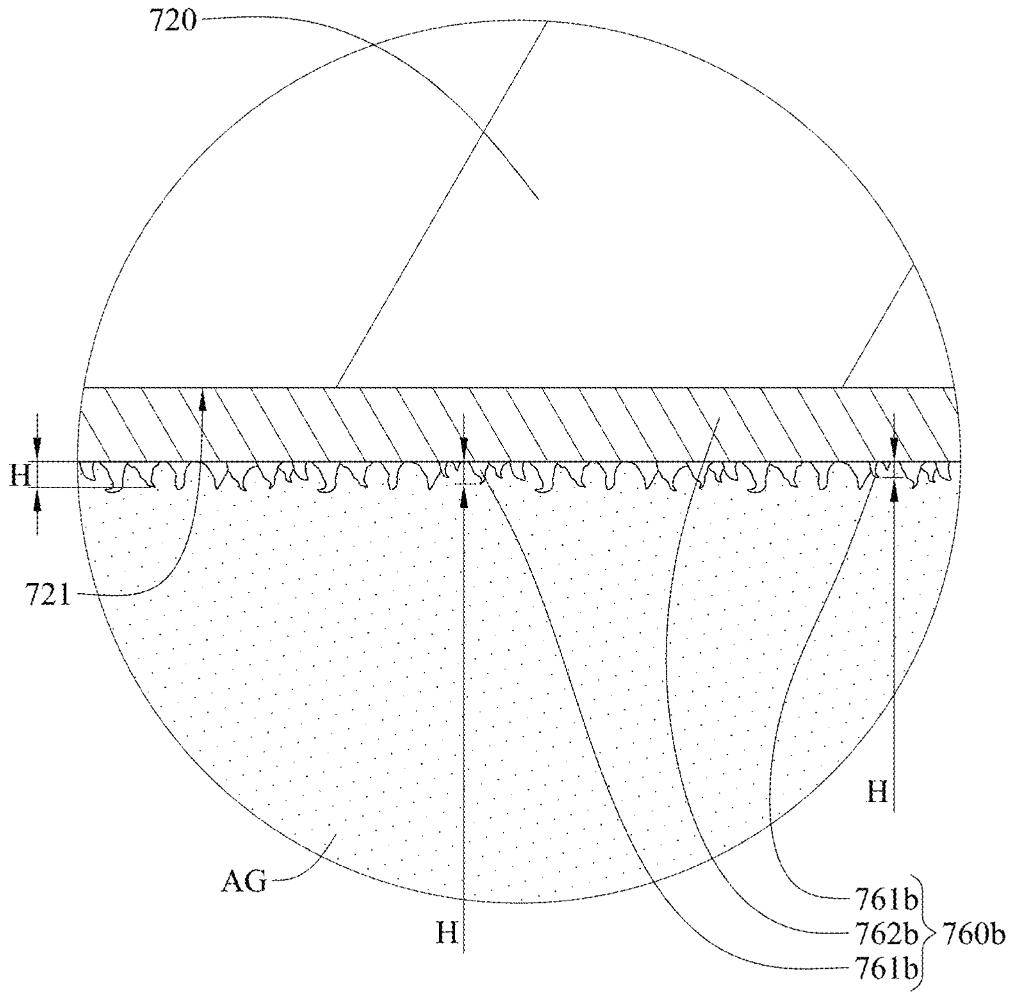
FIG. 22 is an enlarged view of II region of the camera module of FIG. 20.

Please refer to FIG. 20 and FIG. 22, where FIG. 20 is a cross-sectional view of partial region of a camera module according to the 7th embodiment of the present disclosure, FIG. 21 is an enlarged view of HH region of the camera module of FIG. 20, and FIG. 22 is an enlarged view of II region of the camera module of FIG. 20.

In this embodiment, a camera module 7 is provided, which includes a lens module (not shown), an image sensing module 7*b* and a protection layer 7*c* that are sequentially disposed.

The image sensing module 7*b* includes a circuit substrate 710, an optical flat element 720, a sensing element 730, a plurality of metal protrusions 740, a filling element 750 and a plurality of anti-reflection layers 760*a*-760*b*. The circuit substrate 710, the optical flat element 720, the sensing element 730, the metal protrusions 740, the filling element 750 and the anti-reflection layers 760*a*-760*b* of the image sensing module 7*b* are respectively similar to the circuit substrate 110, the optical flat element 120, the sensing element 130, the metal protrusions 140, the filling element 150 and the anti-reflection layers 160*a*-160*d* of the image sensing module 1*b*, so only differences between this and the 1st embodiments would be illustrated hereinafter.

The metal protrusions 740 are in hourglass shapes. The filling element 750 has at least part disposed on the opening surface 713 of the circuit substrate 710. The filling element 750 has a curved surface 751 which is convex and faces the optical flat element 720.

When a distance between the lower surface 712 of the circuit substrate 710 and the optical flat element 720 is D1, and a thickness of the air gap AG is D2, the following conditions are satisfied: D1=0.11 mm; D2=0.26 mm; and D1/D2=0.42.

The anti-reflection layer 760*a* is disposed on the outer surface 722 of the optical flat element 720, as shown in FIG. 20 and FIG. 21. The anti-reflection layer 760*b* is disposed on the inner surface 721 of the optical flat element 720, as shown in FIG. 20 and FIG. 22.

The anti-reflection layer 760*a* includes a plurality of nano-ridge structures 761*a* and an interlayer 762*a* disposed between the outer surface 722 and the nano-ridge structures 761*a*. The nano-ridge structures 761*a* extend from the interlayer 762*a* along a direction away from the outer surface 722, and the nano-ridge structures 761*a* are irregularly arranged, as shown in FIG. 21. Furthermore, the thickness of the interlayer 762*a* can be greater than the height of the nano-ridge structures 761*a*.

When a height of each of any three of the plurality of nano-ridge structures 761*a* chosen for the height measurement is H, the following conditions are satisfied: H=82 nm; 194 nm; and 150 nm, as shown by the labels marked as H sequentially from the left hand side to the right hand side of FIG. 21.

The anti-reflection layer 760*b* includes a plurality of nano-ridge structures 761*b* and an interlayer 762*b* disposed between the inner surface 721 and the nano-ridge structures 761*b*. The nano-ridge structures 761*b* extend from the interlayer 762*b* towards the air gap AG along a direction from the inner surface 721 to the air gap AG, and the nano-ridge structures 761*b* are irregularly arranged, as shown in FIG. 22. Furthermore, the thickness of the interlayer 762*b* can be greater than the height of the nano-ridge structures 761*b*, and the interlayer 762*b* can have at least one area exposed to the air gap AG.

When a height of each of any three of the plurality of nano-ridge structures 761*b* chosen for the height measurement is H, the following conditions are satisfied: H=150 nm; 131 nm; and 93 nm, as shown by the labels marked as H sequentially from the left hand side to the right hand side of FIG. 22.

Further Configurations of Camera Module

The camera module 1 of the present disclosure may have other configurations except for that shown in FIG. 4.

Figure 23:
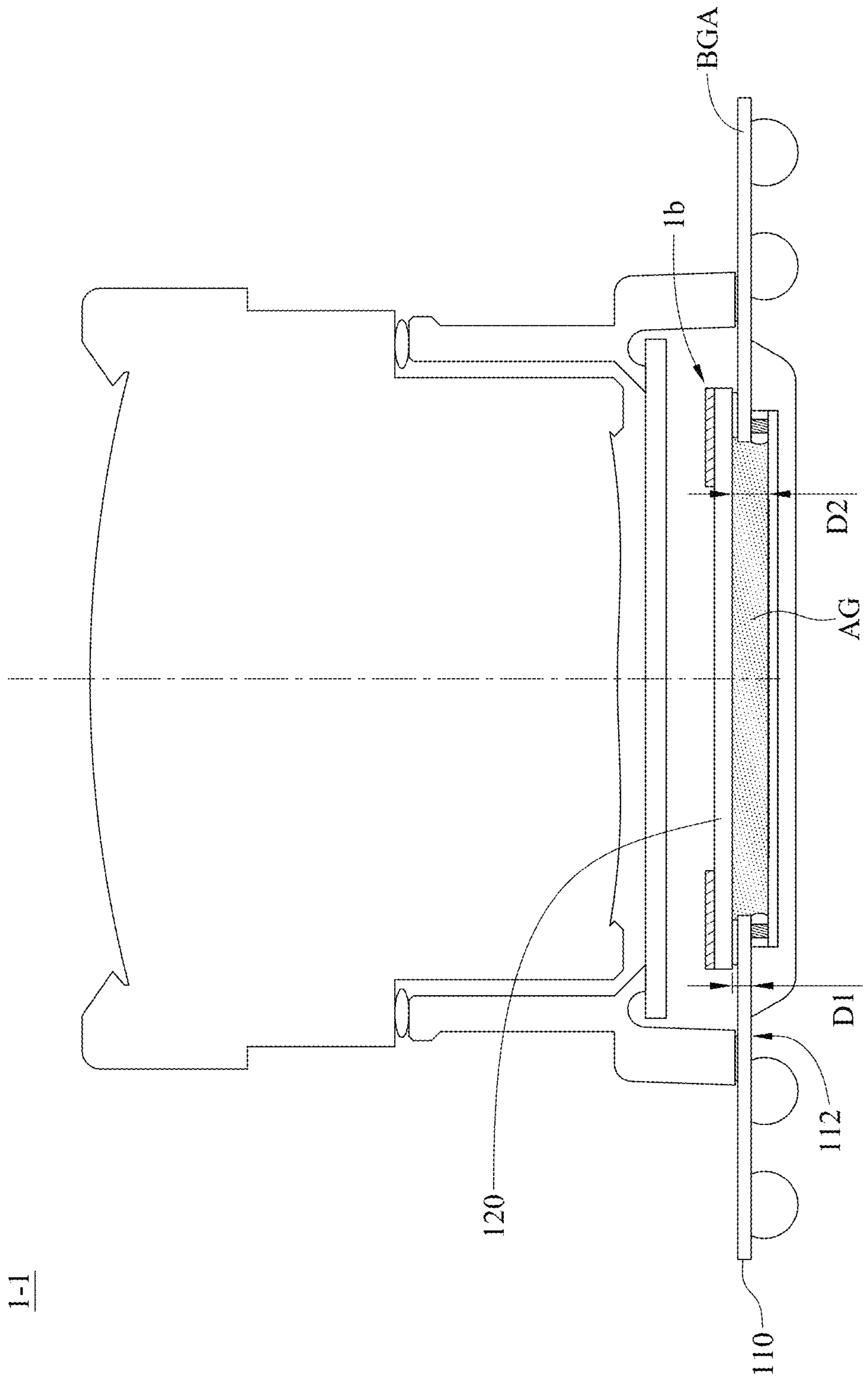
FIG. 23 is a cross-sectional view showing one configuration of a camera module according to one embodiment of the present disclosure.

Please refer to FIG. 23, which is a cross-sectional view showing one configuration of a camera module according to one embodiment of the present disclosure. As shown in FIG. 23, a camera module 1-1 can further include a ball grid array BGA provided with the image sensing module 1*b*.

In the configuration of the camera module 1-1, the distance between the lower surface 112 of the circuit substrate 110 and the optical flat element 120 is D1, the thickness of the air gap AG is D2, and the following conditions are satisfied: D1=0.21 mm; D2=0.4 mm; and D1/D2=0.53. However, the present disclosure is not limited thereto.

Figure 24:
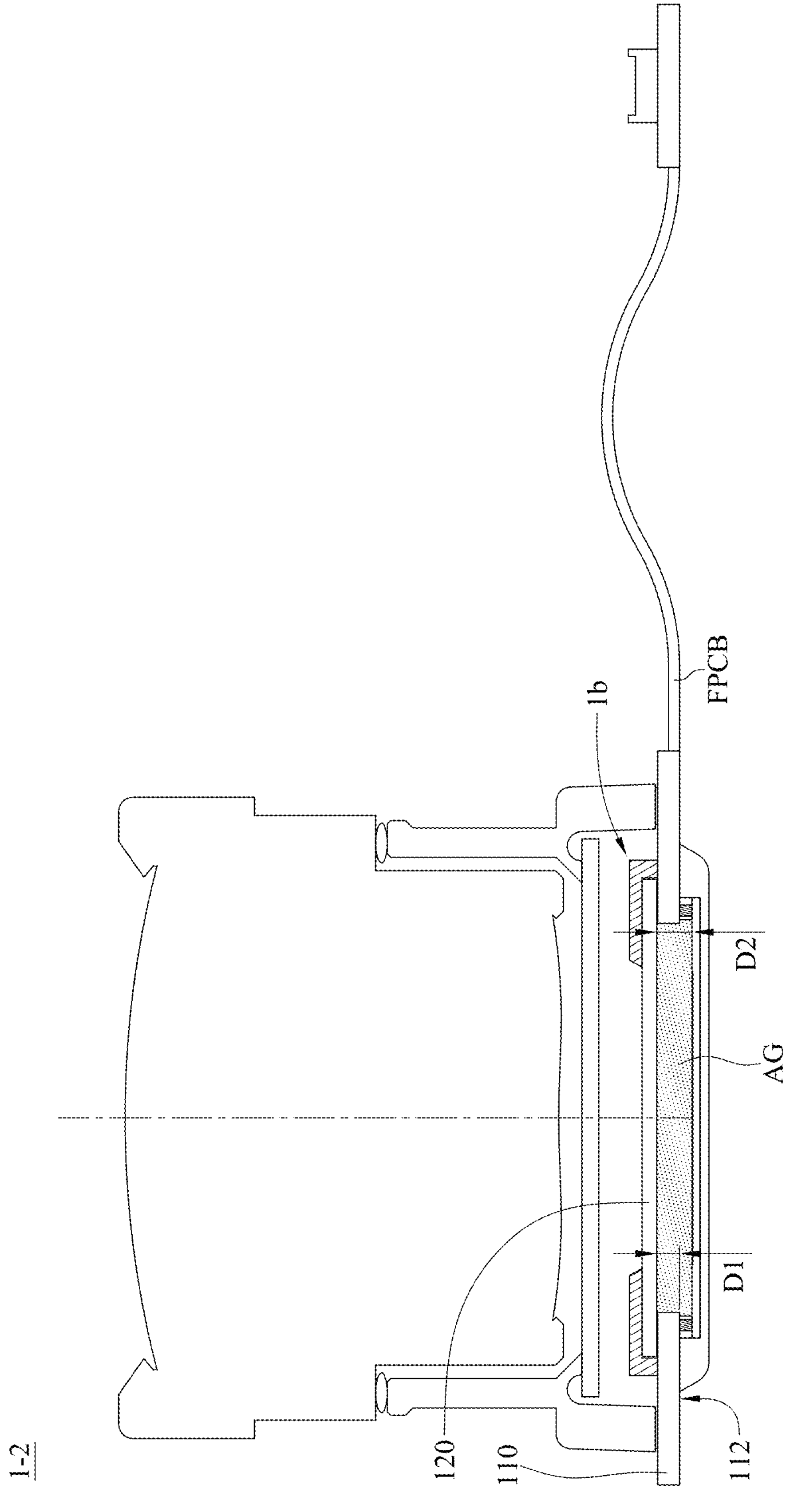
FIG. 24 is a cross-sectional view showing another configuration of a camera module according to one embodiment of the present disclosure.

Please refer to FIG. 24, which is a cross-sectional view showing another configuration of a camera module according to one embodiment of the present disclosure. As shown in FIG. 24, a camera module 1-2 can further include a flexible printed circuit board FPCB provided with the image sensing module 1*b*.

In the configuration of the camera module 1-2, the distance between the lower surface 112 of the circuit substrate 110 and the optical flat element 120 is D1, the thickness of the air gap AG is D2, and the following conditions are satisfied: D1=0.31 mm; D2=0.48 mm; and D1/D2=0.65. However, the present disclosure is not limited thereto.

Figure 25:
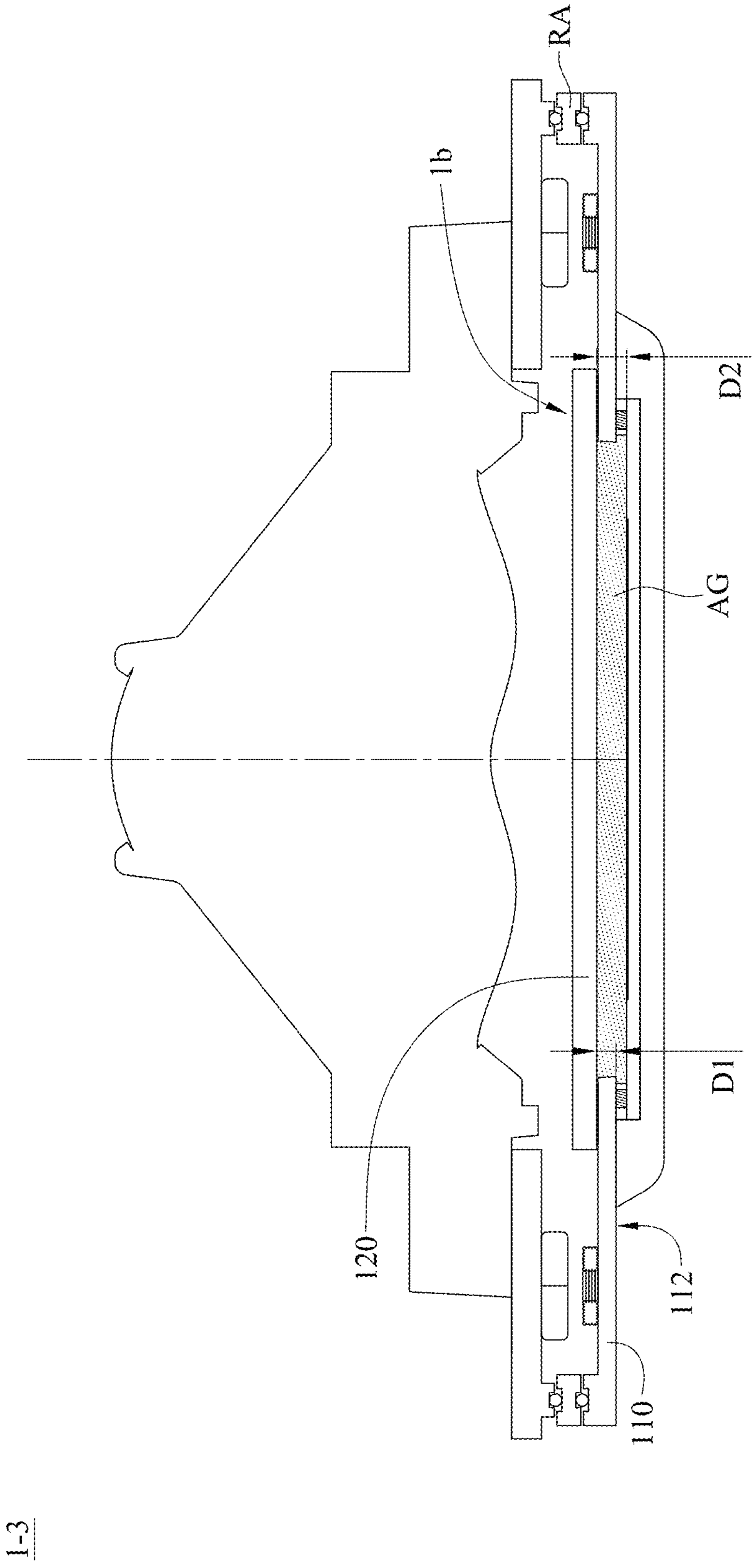
FIG. 25 is a cross-sectional view showing further another configuration of a camera module according to one embodiment of the present disclosure.

Please refer to FIG. 25, which is a cross-sectional view showing further another configuration of a camera module according to one embodiment of the present disclosure. As shown in FIG. 25, a camera module 1-3 can further include a rolling assembly RA provided with the image sensing module 1*b* for providing at least one degree of movement of the image sensing module 1*b*.

In the configuration of the camera module 1-3, the distance between the lower surface 112 of the circuit substrate 110 and the optical flat element 120 is D1, the thickness of the air gap AG is D2, and the following conditions are satisfied: D1=0.16 mm; D2=0.25 mm; and D1/D2=0.64. However, the present disclosure is not limited thereto.

Figure 26:
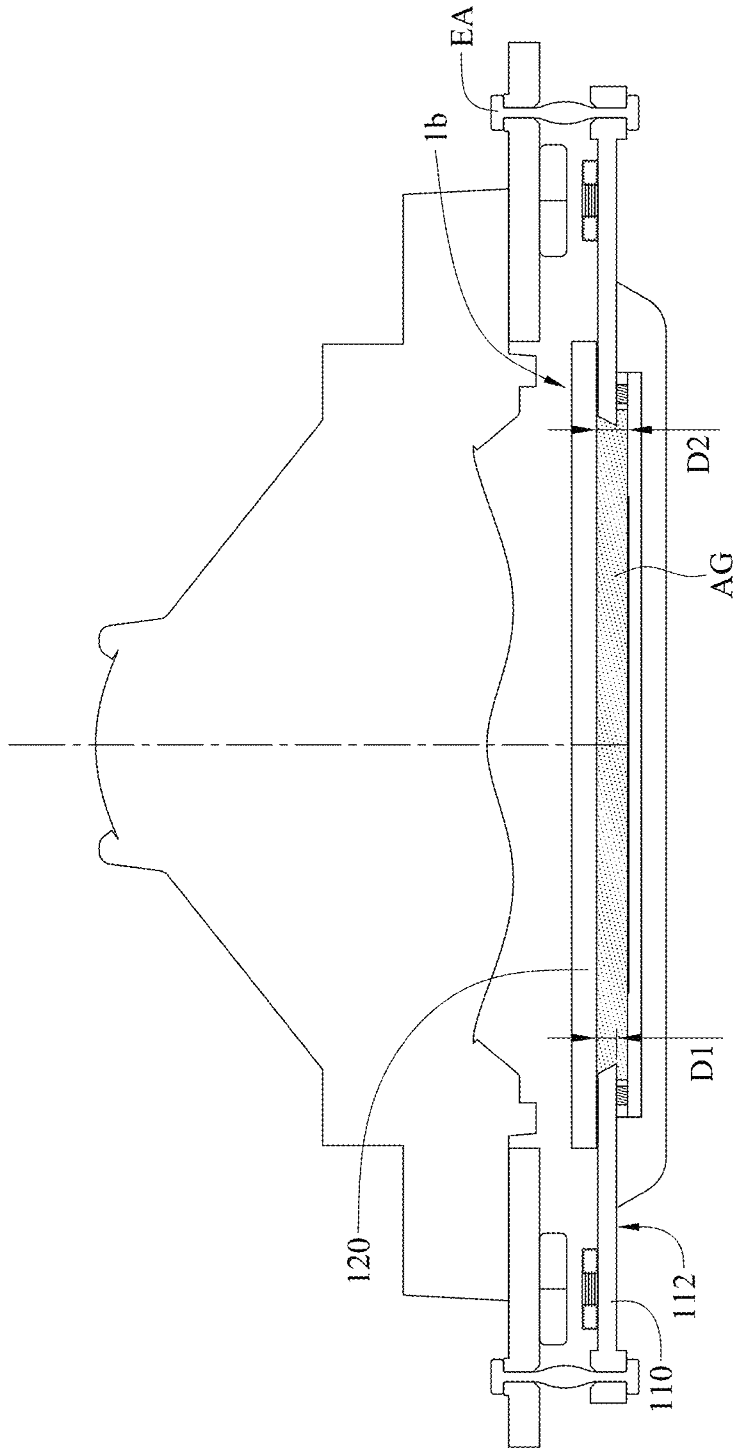
FIG. 26 is a cross-sectional view showing still another configuration of a camera module according to one embodiment of the present disclosure.

Please refer to FIG. 26, which is a cross-sectional view showing still another configuration of a camera module according to one embodiment of the present disclosure. As shown in FIG. 26, a camera module 1-4 can further include an elastic assembly EA provided with the image sensing module 1*b* for providing at least one degree of movement of the image sensing module 1*b*.

In the configuration of the camera module 1-4, the distance between the lower surface 112 of the circuit substrate 110 and the optical flat element 120 is D1, the thickness of the air gap AG is D2, and the following conditions are satisfied: D1=0.16 mm; D2=0.25 mm; and D1/D2=0.64. However, the present disclosure is not limited thereto.

The abovementioned configurations are not only adapted for the camera module 1 of the 1st embodiment, but also the camera modules 2-7 and other camera modules.

8th Embodiment

Figure 27:
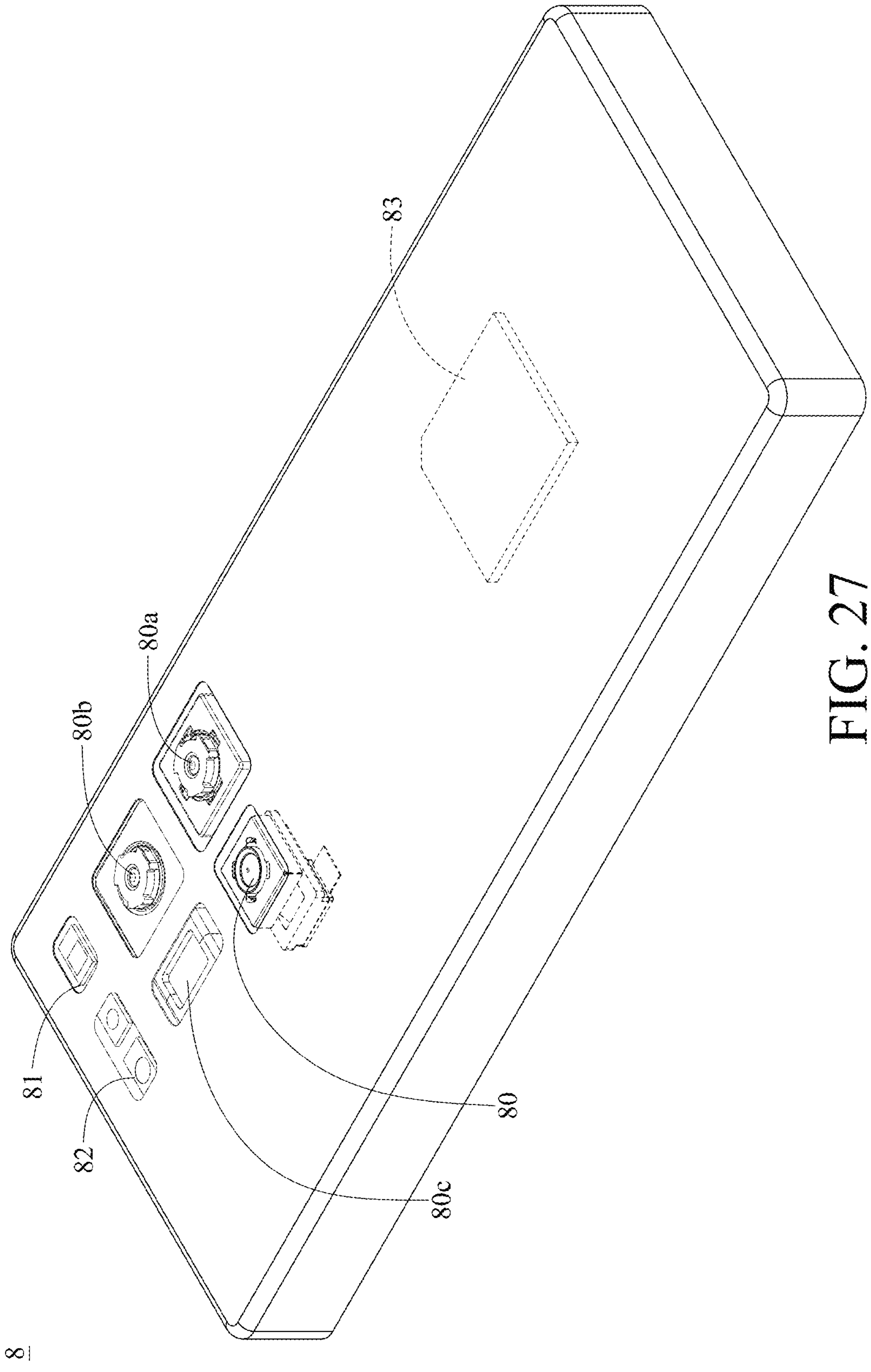
FIG. 27 is one perspective view of an electronic device according to the 8th embodiment of the present disclosure.
Figure 28:
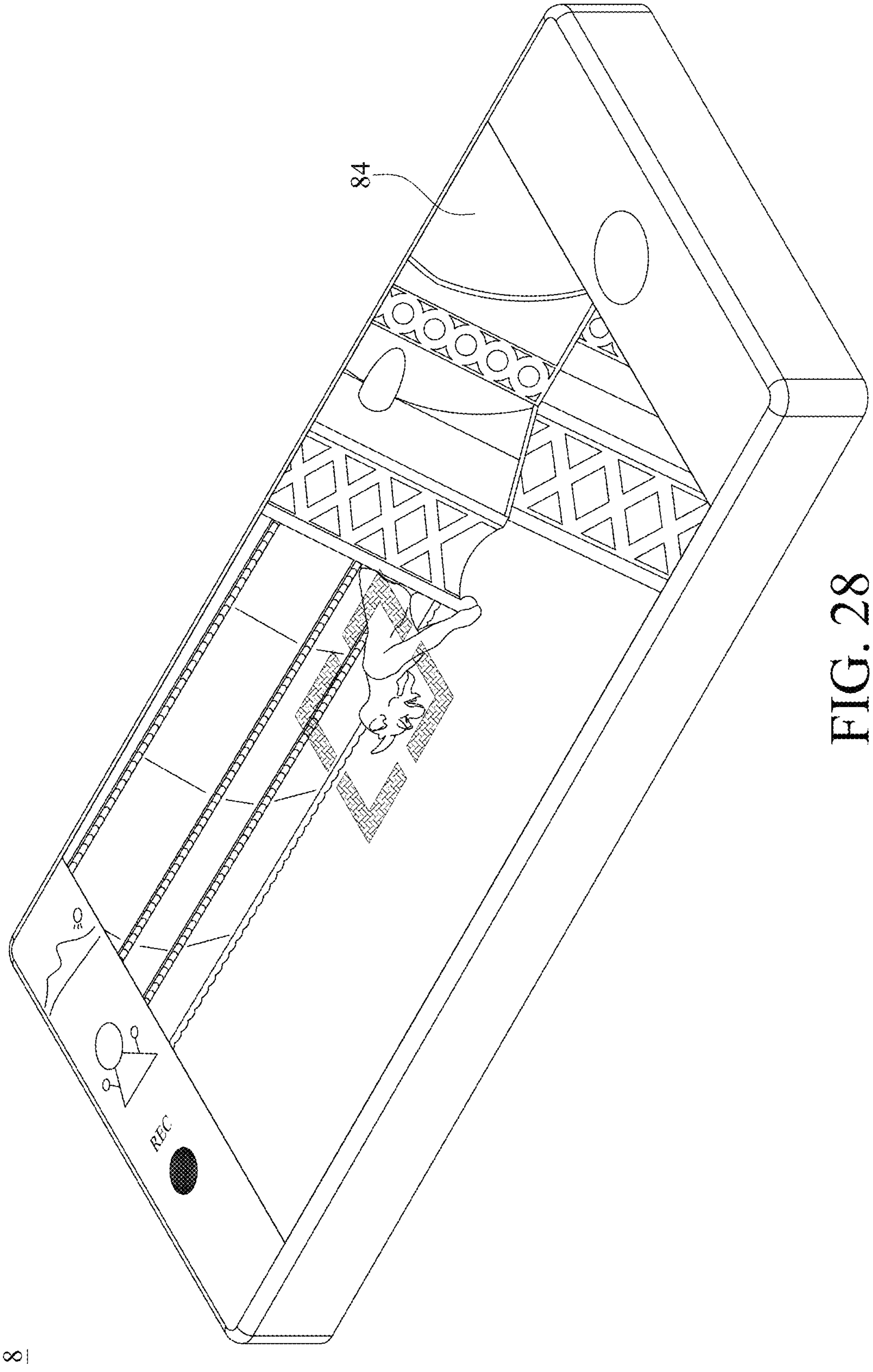
FIG. 28 is another perspective view of the electronic device in FIG. 27.

Please refer to FIG. 27 to FIG. 28, where FIG. 27 is one perspective view of an electronic device according to the 8th embodiment of the present disclosure, and FIG. 28 is another perspective view of the electronic device in FIG. 27.

In this embodiment, an electronic device 8 is a smartphone including a plurality of camera modules, a flash module 81, a focus assist module 82, an image signal processor 83, a display module (user interface) 84 and an image software processor (not shown).

The camera modules include an ultra-wide-angle camera module 80*a*, a high pixel camera module 80*b*, a telephoto camera module 80*c* and a telephoto camera module 80. Moreover, the camera module 80 includes one of the camera modules 1 to 7 and 1-1 to 1-4 of the present disclosure.

Figure 29:
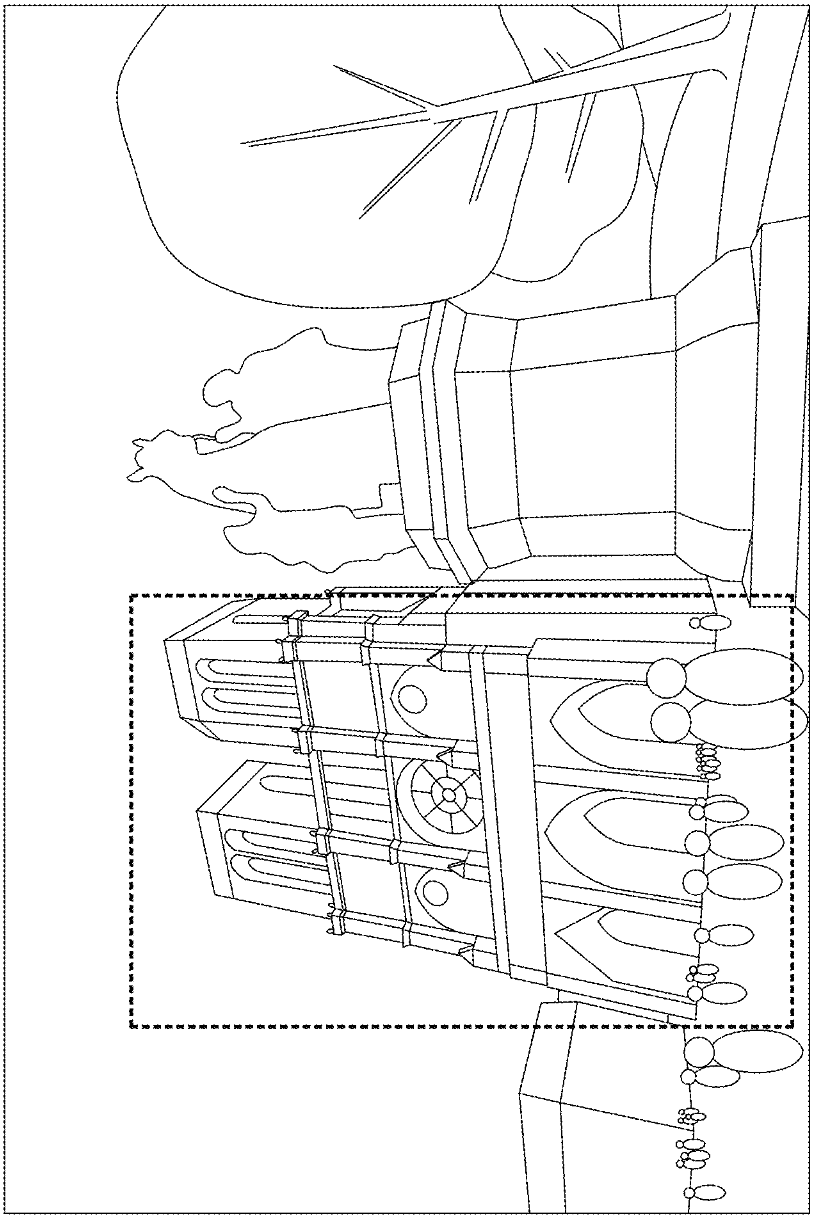
FIG. 29 is an image captured by an ultra-wide-angle camera module.

The image captured by the ultra-wide-angle camera module 80*a* enjoys a feature of multiple imaged objects. FIG. 29 is an image captured by the ultra-wide-angle camera module 80*a*. Moreover, the maximum field of view (FOV) of the camera module 80*a* corresponds to the viewing angle in FIG. 29.

Figure 30:
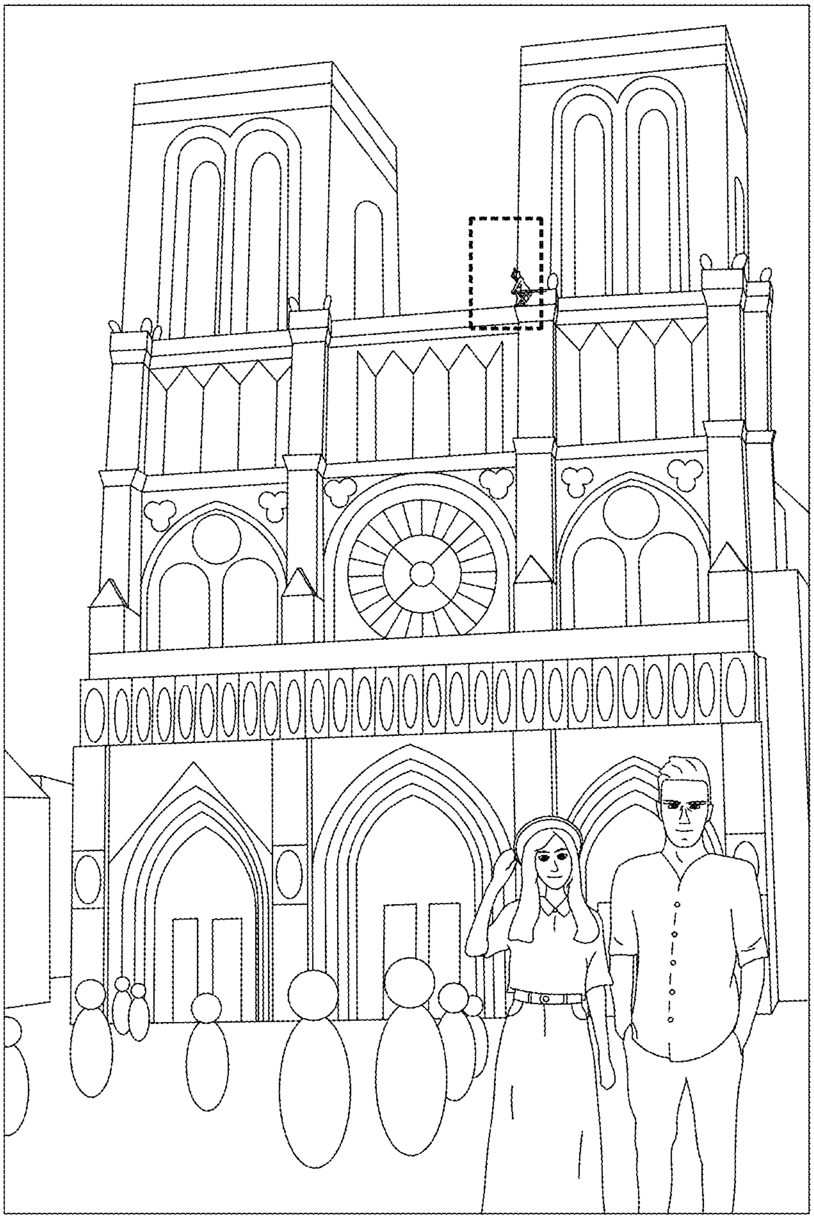
FIG. 30 is an image captured by a high pixel camera module.

The image captured by the high pixel camera module 80*b* enjoys a feature of high resolution and less distortion, and the high pixel camera module 80*b* can capture part of the image in FIG. 29. FIG. 30 is an image captured by the high pixel camera module 80*b*.

Figure 31:
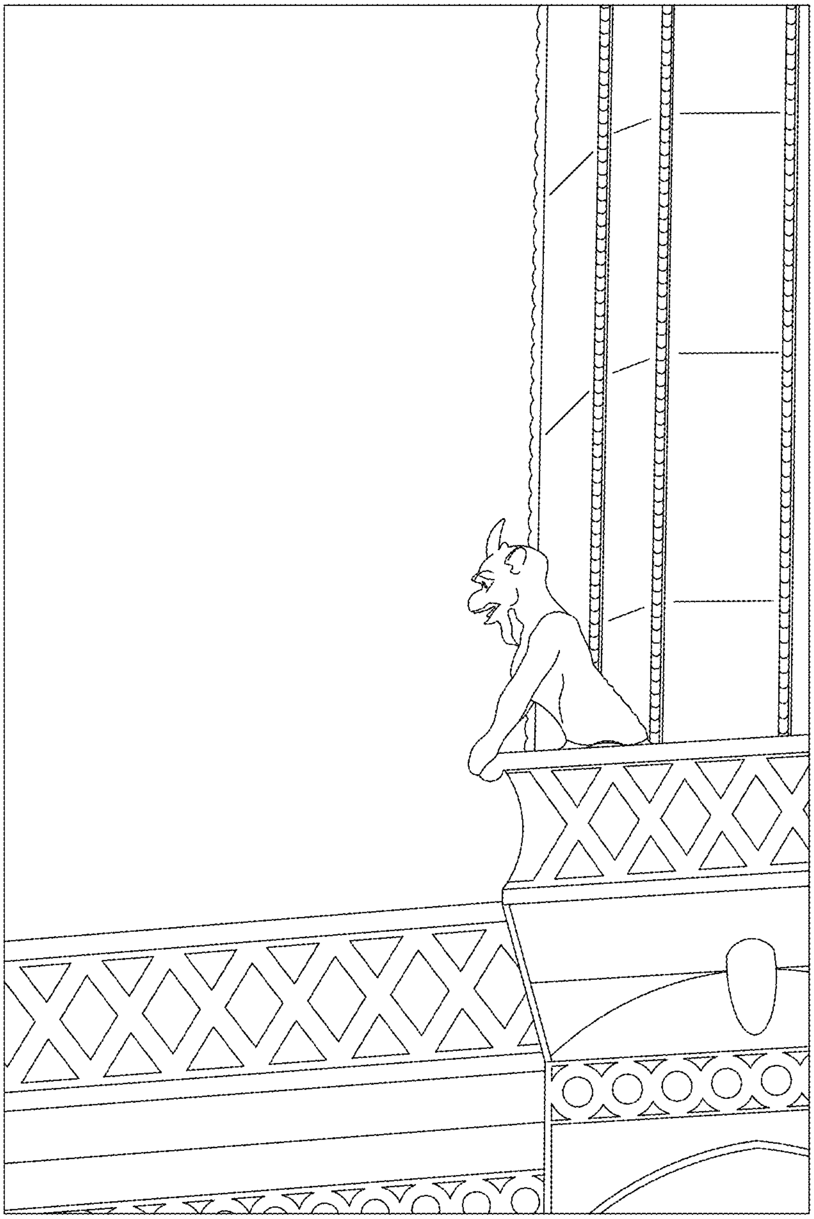
FIG. 31 is an image captured by a telephoto camera module.

The image captured by the telephoto camera module 80*c* enjoys a feature of high optical magnification, and the telephoto camera module 80*c* can capture part of the image in FIG. 30. FIG. 31 is an image captured by the telephoto camera module 80*c*.

When a user captures images of an object, the light rays converge in the ultra-wide-angle camera module 80*a*, the high pixel camera module 80*b*, the telephoto camera module 80*c* or the telephoto camera module 80 to generate images, and the flash module 81 is activated for light supplement. The focus assist module 82 detects the object distance of the imaged object to achieve fast auto focusing. The image signal processor 83 is configured to optimize the captured image to improve image quality and provided zooming function. The light beam emitted from the focus assist module 82 can be either conventional infrared or laser. The display module 84 can include a touch screen, and the user is able to interact with the display module 84 to adjust the angle of view and switch between different camera modules, and the image software processor having multiple functions to capture images and complete image processing. Alternatively, the user may capture images via a physical button. The image processed by the image software processor can be displayed on the display module 84.

9th Embodiment

Figure 32:
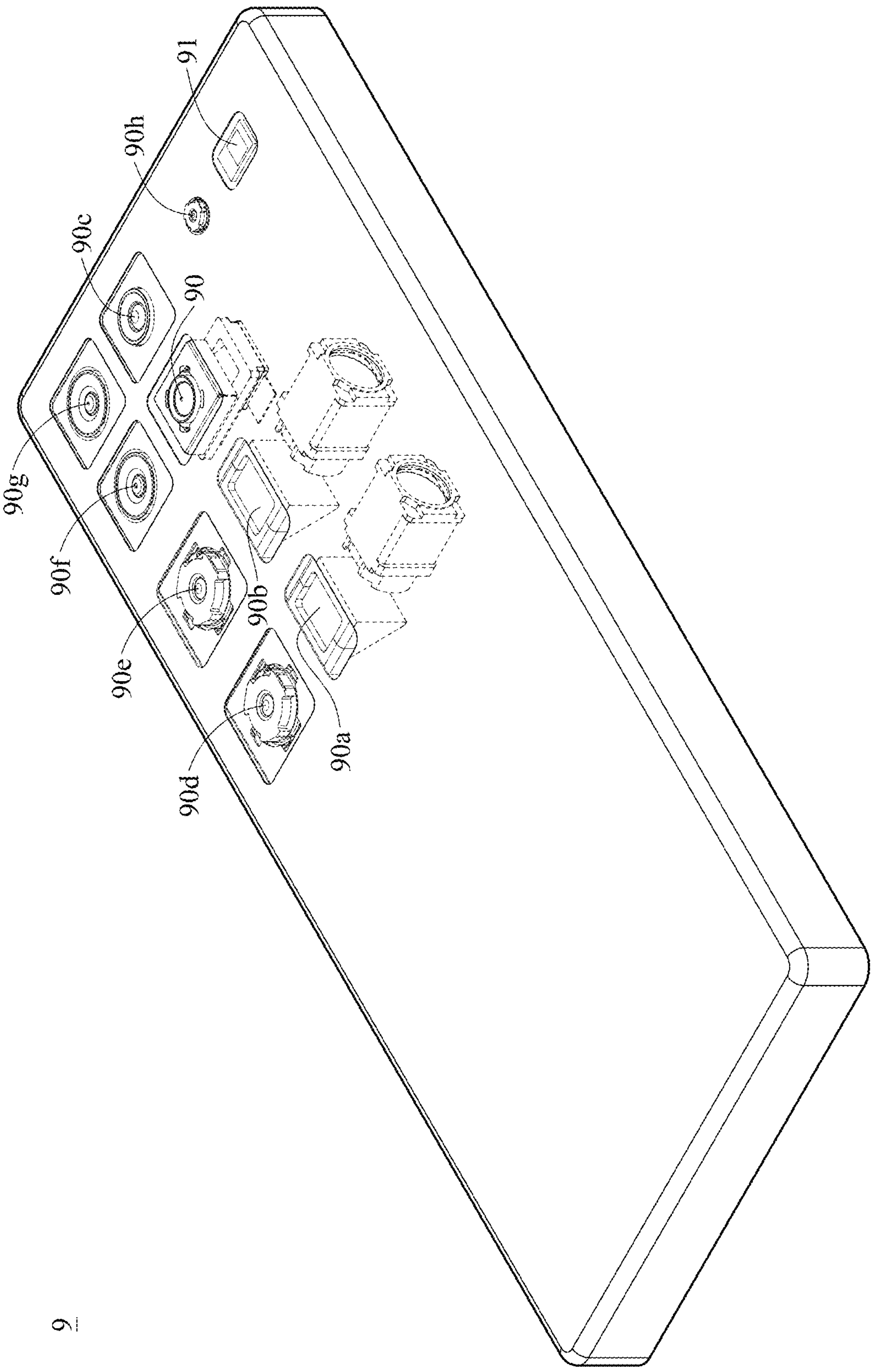
FIG. 32 is one perspective view of an electronic device according to the 9th embodiment of the present disclosure.

Please refer to FIG. 32, which is one perspective view of an electronic device according to the 9th embodiment of the present disclosure.

In this embodiment, an electronic device 9 is a smartphone including a camera module 90, a camera module 90*a*, a camera module 90*b*, a camera module 90*c*, a camera module 90*d*, a camera module 90*e*, a camera module 90*f*, a camera module 90*g*, a camera module 90*h*, a flash module 91, an image signal processor, a display module and an image software processor (not shown). The camera module 90, the camera module 90*a*, the camera module 90*b*, the camera module 90*c*, the camera module 90*d*, the camera module 90*e*, the camera module 90*f*, the camera module 90*g* and the camera module 90*h* are disposed on the same side of the electronic device 9, while the display module is disposed on the opposite side of the electronic device 9. Moreover, the camera module 90 includes one of the camera modules 1 to 7 and 1-1 to 1-4 of the present disclosure.

The camera module 90 is a telephoto camera module, the camera module 90*a* is a telephoto camera module, the camera module 90*b* is a telephoto camera module, the camera module 90*c* is a telephoto camera module, the camera module 90*d* is a wide-angle camera module, the camera module 90*e* is a wide-angle camera module, the camera module 90*f* is an ultra-wide-angle camera module, the camera module 90*g* is an ultra-wide-angle camera module, and the camera module 90*h* is a ToF (time of flight) camera module. In this embodiment, the camera module 90, the camera module 90*a*, the camera module 90*b*, the camera module 90*c*, the camera module 90*d*, the camera module 90*e*, the camera module 90*f* and the camera module 90*g* have different fields of view, such that the electronic device 9 can have various magnification ratios so as to meet the requirement of optical zoom functionality. In addition, the camera module 90*a* and the camera module 90*b* each are a telephoto camera module having a light-folding element configuration. In addition, the camera module 90*h* can determine depth information of the imaged object. In this embodiment, the electronic device 9 includes a plurality of camera modules 90, 90*a*, 90*b*, 90*c*, 90*d*, 90*e*, 90*f*, 90*g*, and 90*h*, but the present disclosure is not limited to the number and arrangement of camera module. When a user captures images of an object, the light rays converge in the camera modules 90, 90*a*, 90*b*, 90*c*, 90*d*, 90*e*, 90*f*, 90*g* or 90*h* to generate an image(s), and the flash module 91 is activated for light supplement. Further, the subsequent processes are performed in a manner similar to the abovementioned embodiments, so the details in this regard will not be provided again.

10th Embodiment

Figure 33:
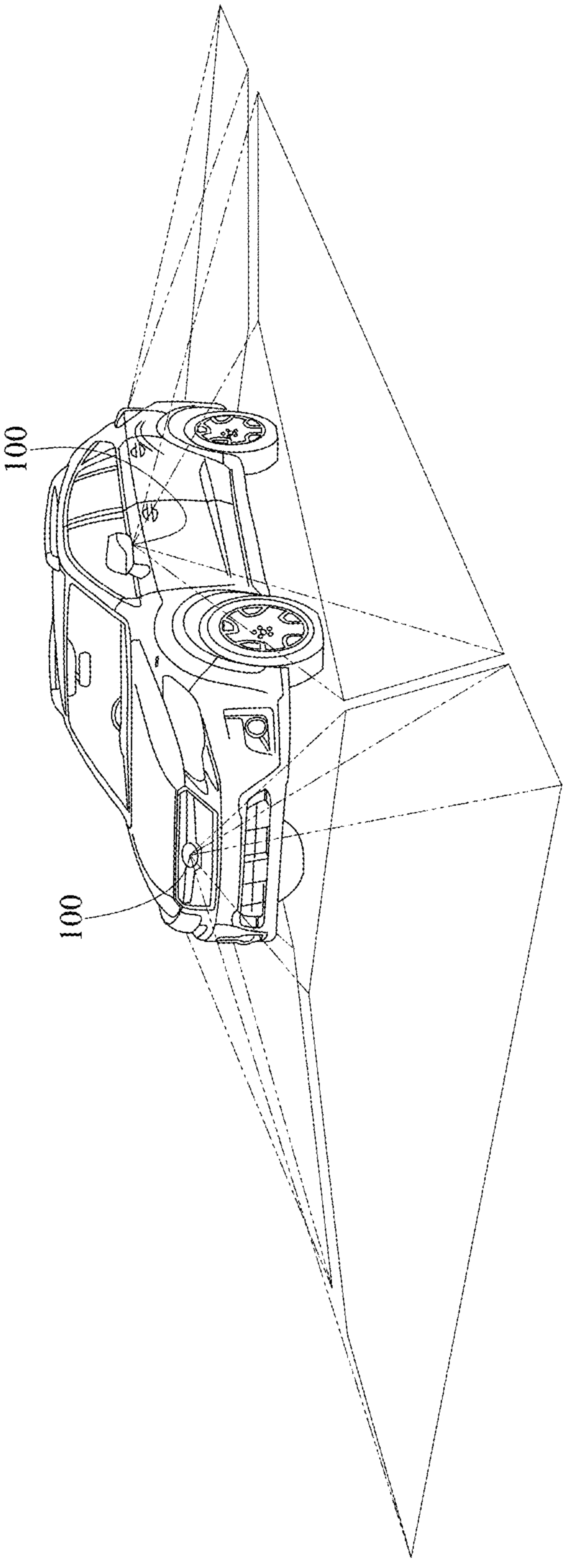
FIG. 33 is a perspective view of an electronic device according to the 10th embodiment of the present disclosure.
Figure 34:
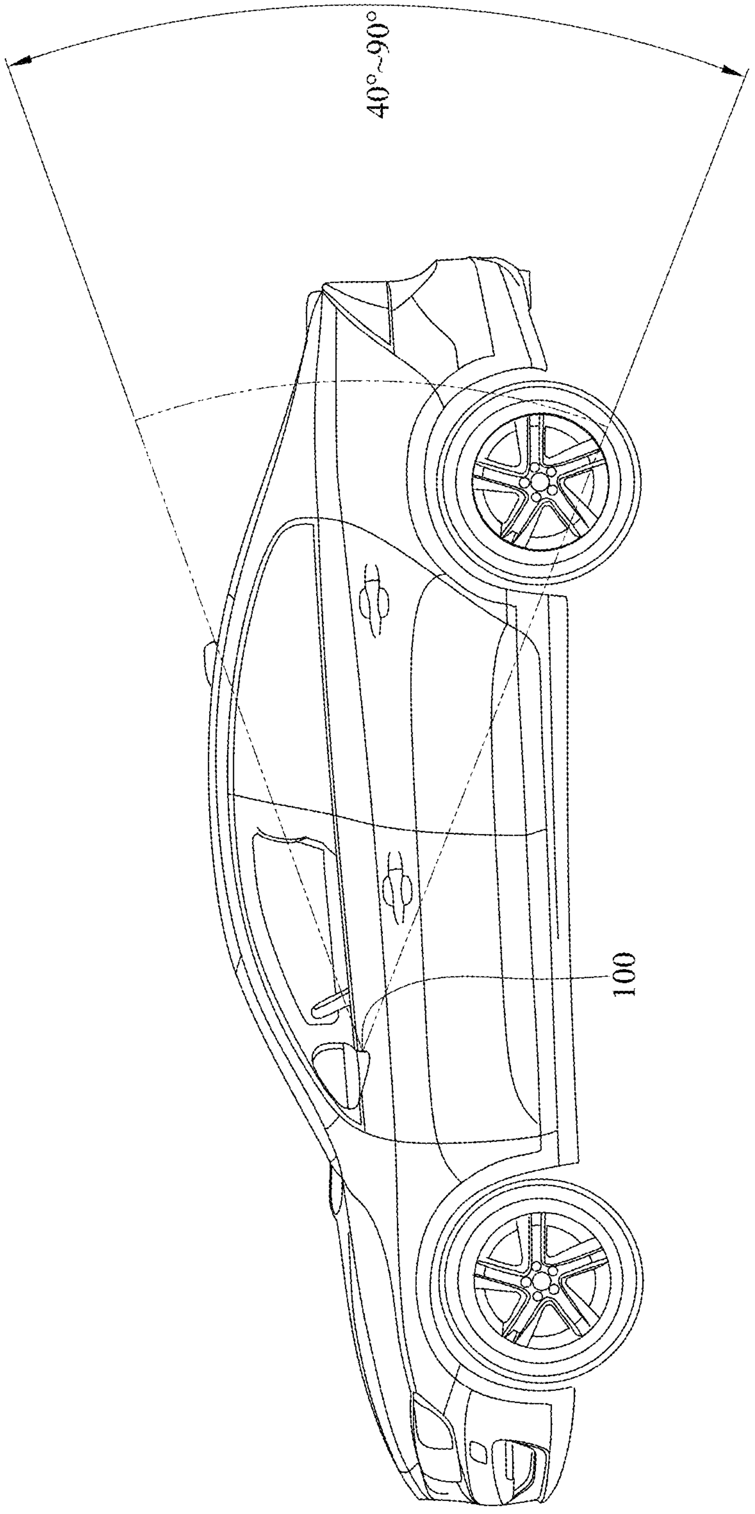
FIG. 34 is a side view of the electronic device in FIG. 33.
Figure 35:
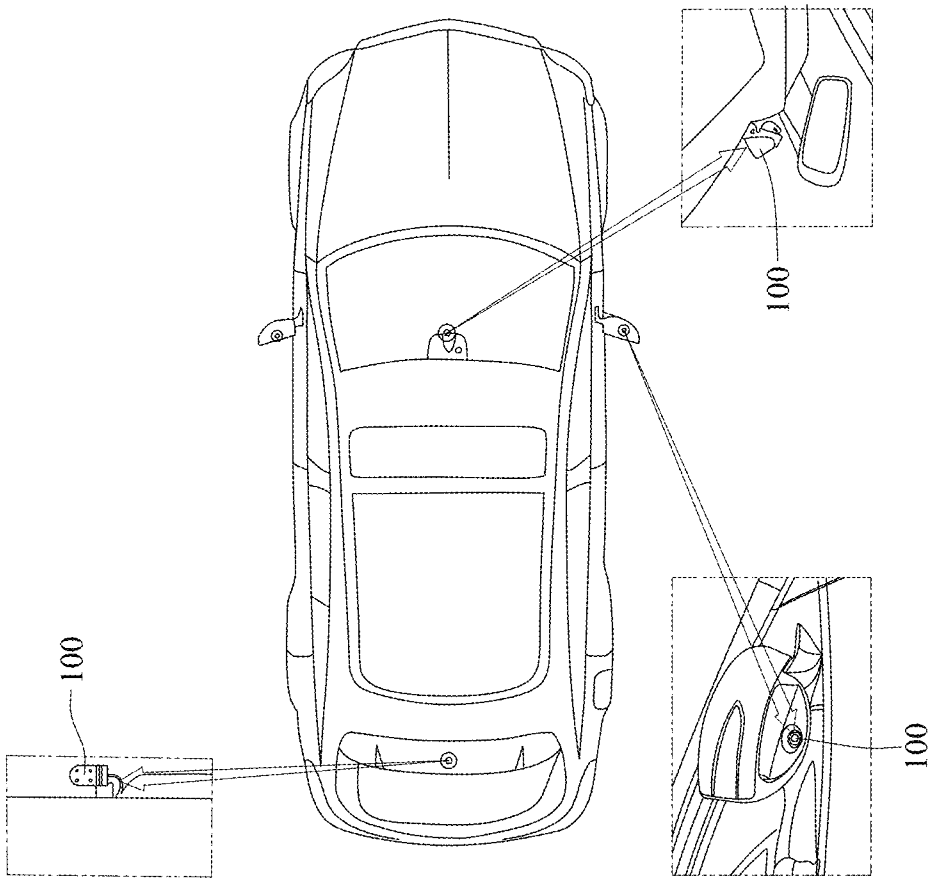
FIG. 35 is a top view of the electronic device in FIG. 33.

Please refer to FIG. 33 to FIG. 35, where FIG. 33 is a perspective view of an electronic device according to the 10th embodiment of the present disclosure, FIG. 34 is a side view of the electronic device in FIG. 33, and FIG. 35 is a top view of the electronic device in FIG. 33.

In this embodiment, an electronic device 10 is an automobile. The electronic device 10 includes a plurality of automotive camera modules 100, and the camera modules 100, for example, each include one of the camera modules 1 to 7 and 1-1 to 1-4 of the present disclosure. The camera modules 100 can be served as, for example, panoramic view car cameras, dashboard cameras and vehicle backup cameras.

As shown in FIG. 33, the camera modules 100 are disposed, for example, around the automobile to capture peripheral images of the automobile, which is favorable for recognizing road conditions outside the automobile so as to achieve an automatic driving assistant. In addition, the image software processor may stitch the peripheral images into a panorama image for the driver's checking every corner surrounding the automobile, thereby favorable for parking and driving.

As shown in FIG. 34, the camera modules 100 are disposed, for example, on the lower portions of the side mirrors. A maximum field of view of each of the camera modules 100 can range from 40 degrees to 90 degrees for capturing images on left and right sides within nearby lane regions.

As shown in FIG. 35, the camera modules 100 are disposed, for example, on the lower portions of the side mirrors and further at the inner sides of the front and rear windshields for providing external information to the driver, and also providing more viewing angles so as to reduce blind spots, thereby improving driving safety. The smartphones or the automobile in the embodiments are only exemplary for showing the camera modules 1 to 7 and 1-1 to 1-4 of the present disclosure installed in an electronic device 8, 9 or 10, and the present disclosure is not limited thereto. The camera modules 1 to 7 and 1-1 to 1-4 can be optionally applied to optical systems with a movable focus. Furthermore, the camera modules 1 to 7 and 1-1 to 1-4 feature good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices, other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image sensing module comprising:

a circuit substrate having:

an upper surface;

a lower surface disposed opposite to the upper surface;

an opening surface connected to the upper surface and the lower surface; and an opening located at the opening surface;

an optical flat element fixed on the upper surface of the circuit substrate, wherein the optical flat element is disposed corresponding to the opening of the circuit substrate;

a sensing element disposed on the lower surface of the circuit substrate, wherein the opening of the circuit substrate is located between the sensing element and the optical flat element, the sensing element and the optical flat element form an air gap therebetween, and the opening surface surrounds the air gap; and a plurality of metal protrusions disposed between the circuit substrate and the sensing element, wherein each of the plurality of metal protrusions is electrically connected to the circuit substrate and the sensing element;

wherein the image sensing module further comprises at least one anti-reflection layer disposed on at least one surface at the air gap, the at least one anti-reflection layer comprises:

a plurality of nano-ridge structures extending along a direction from the at least one surface at the air gap towards the air gap, wherein the plurality of nano-ridge structures are irregularly arranged.

2. The image sensing module according to claim 1, wherein a height of each of the plurality of nano-ridge structures is H, and the following condition is satisfied:

$$25\text{ nm}\leq H\leq 400\text{ nm}.$$

3. The image sensing module according to claim 2, wherein the height of each of the plurality of nano-ridge structures is H, and the following condition is satisfied:

$$40\text{ nm}\leq H\leq 280\text{ nm}.$$

4. The image sensing module according to claim 1, wherein the at least one anti-reflection layer further comprises an interlayer disposed between the at least one surface at the air gap and the plurality of nano-ridge structures.

5. The image sensing module according to claim 4, wherein at least one area of the interlayer is exposed to the air gap.

6. The image sensing module according to claim 1, wherein the sensing element has:

a sensing surface disposed corresponding to the opening of the circuit substrate, wherein the sensing surface is configured to convert an optical image signal into an electrical signal; and a periphery surface disposed surrounding the sensing surface;

wherein the at least one anti-reflection layer is disposed on at least one of the sensing surface and the periphery surface of the sensing element.

7. The image sensing module according to claim 6, wherein the plurality of metal protrusions are disposed on the periphery surface and arranged on at least one side of the periphery surface.

8. The image sensing module according to claim 1, wherein the at least one anti-reflection layer is disposed on at least one of the upper surface, the lower surface and the opening surface of the circuit substrate.

9. The image sensing module according to claim 1, wherein the optical flat element has an inner surface disposed facing towards the air gap, and the at least one anti-reflection layer is disposed on the inner surface of the optical flat element.

10. The image sensing module according to claim 1, further comprising a filling element disposed between the circuit substrate and the sensing element, wherein the filling element wholly covers each of the plurality of metal protrusions, and the filling element surrounds and seals the air gap.

11. The image sensing module according to claim 10, wherein the filling element has at least one curved surface on which the at least one anti-reflection layer is disposed.

12. The image sensing module according to claim 10, wherein at least part of the filling element is disposed on the opening surface of the circuit substrate.

13. The image sensing module according to claim 10, wherein the filling element is made of an opaque material.

14. The image sensing module according to claim 1, wherein the circuit substrate further has a plurality of anti-flare structures disposed on the opening surface of the circuit substrate, and the plurality of anti-flare structures taper off towards the air gap from the opening surface.

15. The image sensing module according to claim 1, wherein a distance between the lower surface of the circuit substrate and the optical flat element is D1, a thickness of the air gap is D2, and the following condition is satisfied:

$$0.25\leq D1/D2\leq 0.98.$$

16. The image sensing module according to claim 15, wherein the distance between the lower surface of the circuit substrate and the optical flat element is D1, the thickness of the air gap is D2, and the following condition is satisfied:

$$0.3\leq D1/D2\leq 0.95.$$

17. A camera module comprising:

a lens module; and the image sensing module of claim 1 disposed on an image side of the lens module.

18. An electronic device comprising:

the camera module of claim 17.

* * * * *